(12) United States Patent
Kim et al.

(10) Patent No.: US 12,664,213 B2
(45) Date of Patent: Jun. 23, 2026

(54) METHOD AND DEVICE FOR PREDICTING NEXT EVENT TO OCCUR

(71) Applicant: SAMSUNG ELECTRONICS CO., LTD., Suwon-si (KR)

(72) Inventors: Taehun Kim, Suwon-si (KR); Bumki Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1148 days.

(21) Appl. No.: 17/581,501

(22) Filed: Jan. 21, 2022

(65) Prior Publication Data

US 2022/0197949 A1 Jun. 23, 2022

Related U.S. Application Data

(63) Continuation of application No. PCT/KR2021/019646, filed on Dec. 22, 2021.

(30) Foreign Application Priority Data

Dec. 23, 2020 (KR) ......................... 10-2020-0182423

(51) Int. Cl.
*G06F 16/901* (2019.01)
*G06N 3/04* (2023.01)

(52) U.S. Cl.
CPC ........... *G06F 16/9024* (2019.01); *G06N 3/04* (2013.01)

(58) Field of Classification Search
CPC ............ G06F 16/9024; G06F 16/9027; G06N 3/02–105; G06N 3/04–0499
See application file for complete search history.

(56) References Cited

U.S. PATENT DOCUMENTS

2004/0153307 A1* 8/2004 Tishby ................. G06F 40/289
704/4
2017/0032276 A1 2/2017 Sukhanov et al.
(Continued)

FOREIGN PATENT DOCUMENTS

CN 111367961 A 7/2020
CN 112035746 A 12/2020
(Continued)

OTHER PUBLICATIONS

Li, Zhongyang, Xiao Ding, and Ting Liu. "Constructing narrative event evolutionary graph for script event prediction." arXiv preprint arXiv:1805.05081 (2018). (Year: 2018).*
(Continued)

*Primary Examiner* — Liang Y Li
(74) *Attorney, Agent, or Firm* — Sughrue Mion, PLLC

(57) ABSTRACT

A method and a device for predicting an event to occur in a device are provided. The method includes identifying a plurality of events that occurred in the device; generating a plurality of sequence graphs based on a time-series order of the plurality of events; generating a sequence group graph by combining the plurality of sequence graphs based on relationships between nodes and edges in the plurality of sequence graphs; obtaining a computation graph by sampling the generated sequence group graph based on time-series order information of the plurality of events; and predicting the event to occur in the device using a graph neural network (GNN) based on the obtained computation graph.

11 Claims, 11 Drawing Sheets

(56) References Cited

U.S. PATENT DOCUMENTS

| | | | |
|---|---|---|---|
| 2017/0132513 A1 | 5/2017 | Yu et al. | |
| 2017/0357905 A1 | 12/2017 | Rossi et al. | |
| 2018/0365714 A1* | 12/2018 | Lei | G06Q 30/0202 |
| 2020/0059481 A1* | 2/2020 | Sekar | H04L 63/1425 |
| 2020/0074246 A1 | 3/2020 | Goyal et al. | |
| 2020/0151563 A1* | 5/2020 | Zong | G06N 3/044 |
| 2020/0160177 A1 | 5/2020 | Durand et al. | |
| 2020/0226474 A1 | 7/2020 | Fidler et al. | |

FOREIGN PATENT DOCUMENTS

| | | |
|---|---|---|
| JP | 2002109150 A | 4/2002 |
| KR | 1020200052424 A | 5/2020 |
| KR | 1020200063313 A | 6/2020 |
| WO | 2017/040001 A1 | 3/2017 |

OTHER PUBLICATIONS

Choi, Seungkyu, et al. "An energy-efficient deep convolutional neural network training accelerator for in situ personalization on smart devices." IEEE Journal of Solid-State Circuits 55.10 (Jul. 9, 2020): 2691-2702. (Year: 2020).*

Guo, Shunan, et al. "Visualizing uncertainty and alternatives in event sequence predictions." Proceedings of the 2019 CHI conference on human factors in computing systems. 2019. (Year: 2019).*

Zhang, Mengqi, et al. "Personalized graph neural networks with attention mechanism for session-aware recommendation." IEEE Transactions on Knowledge and Data Engineering 34.8 (Aug. 27, 2020): 3946-3957. (Year: 2020).*

Anil, Akash, et al. "Network sampling using k-hop random walks for heterogeneous network embedding." Proceedings of the ACM India joint international conference on data science and management of data. 2019. (Year: 2019).*

Nishad, Sunil, et al. "Graphreach: Position-aware graph neural network using reachability estimations." arXiv preprint arXiv: 2008.09657 (2020). (Year: 2020).*

International Search Report (PCT/ISA/210) and Written Opinion (PCT/ISA/237) dated Mar. 29, 2022 issued by the International Searching Authority in International Application No. PCT/KR2021/ 019646.

Hamilton, William L. et al., "Inductive Representation Learning on Large Graphs", 31st Conference on Neural Information Processing Systems (NIPS 2017), 2017. (19 pages total).

Huang, Wenbing et al., "Adaptive Sampling Towards Fast Graph Representation Learning", 32nd Conference on Neural Information Processing Systems (NeurIPS2018), 2018. (10 pages total).

Ying, Rex et al., "Graph Convolutional Neural Networks for Web-Scale Recommender Systems", KDD '18, Aug. 19-23, 2018. (10 pages total).

Velickovic, Petar et al., "Graph Attention Networks", ICLR 2018, Feb. 4, 2018. (12 pages total).

Oh, Jihun et al., "Advancing Graphsage With a Data-Driven Node Sampling", ICLR 2019, Apr. 29, 2019. (6 pages total).

Zou, Difan et al., "Layer-Dependent Importance Sampling for Training Deep and Large Graph Convolutional Networks", 33rd Conference on Neural Information Processing Systems (NeurIPS 2019), Nov. 17, 2019. (15 pages total).

Zeng, Hanqing et al., "Graphsaint: Graph Sampling Based Inductive Learning Method", 2020, ICLR 2020. (19 pages total).

Jain, Ankit et al., "Food Discovery with Uber Eats: Using Graph Learning to Power Recommendations", Engineering, Dec. 4, 2019, https://eng.uber.com/uber-eats-graph-learning. (15 pages total).

* cited by examiner

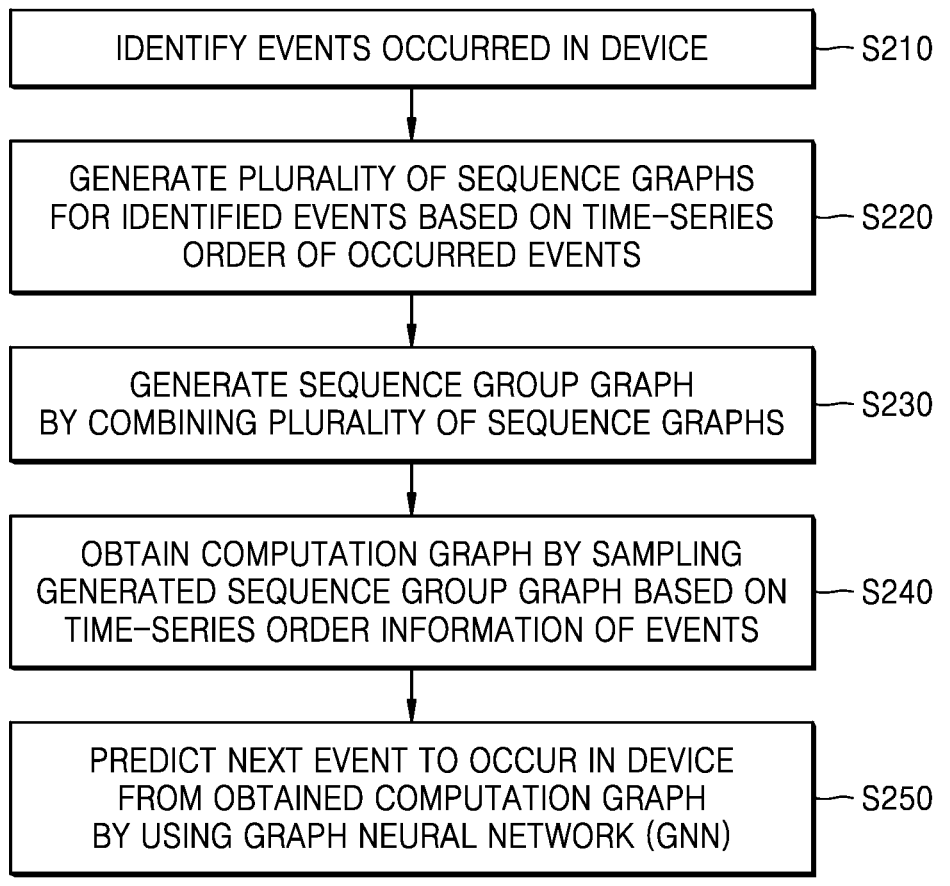

IDENTIFY EVENTS OCCURRED IN DEVICE — S210

GENERATE PLURALITY OF SEQUENCE GRAPHS
FOR IDENTIFIED EVENTS BASED ON TIME–SERIES
ORDER OF OCCURRED EVENTS — S220

GENERATE SEQUENCE GROUP GRAPH
BY COMBINING PLURALITY OF SEQUENCE GRAPHS — S230

OBTAIN COMPUTATION GRAPH BY SAMPLING
GENERATED SEQUENCE GROUP GRAPH BASED ON
TIME–SERIES ORDER INFORMATION OF EVENTS — S240

PREDICT NEXT EVENT TO OCCUR IN DEVICE
FROM OBTAINED COMPUTATION GRAPH
BY USING GRAPH NEURAL NETWORK (GNN) — S250

FIG. 7
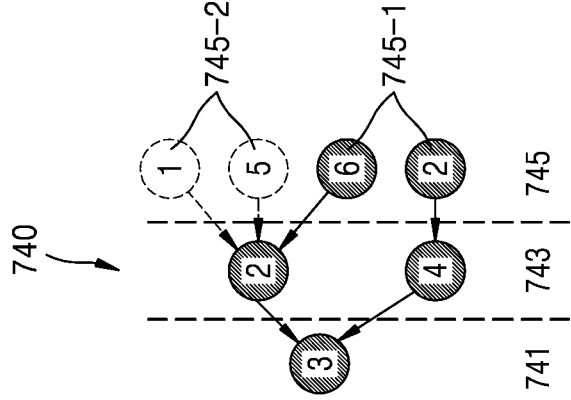
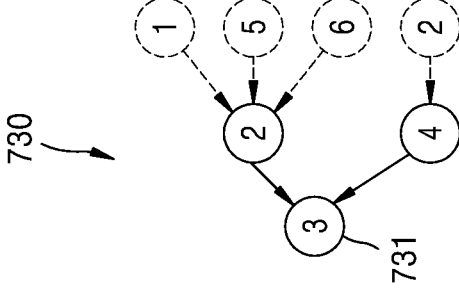
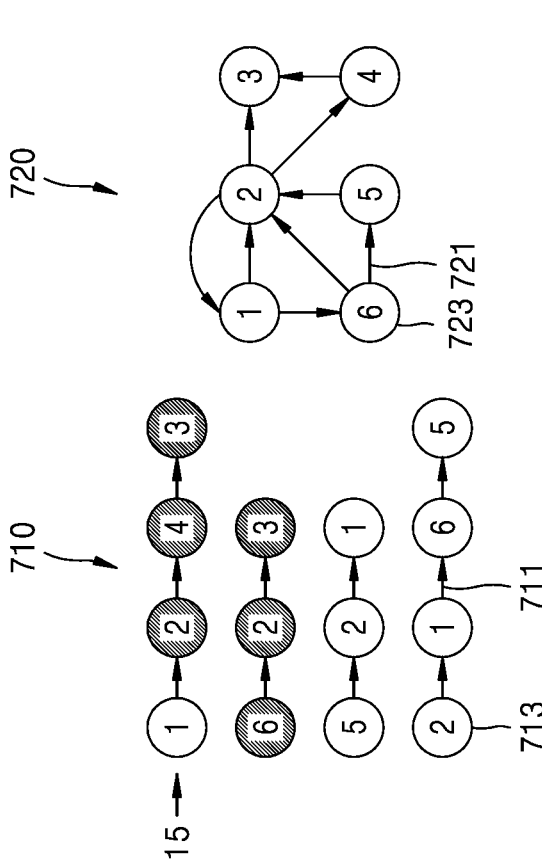

METHOD AND DEVICE FOR PREDICTING NEXT EVENT TO OCCUR

CROSS-REFERENCE TO RELATED APPLICATION(S)

This application is a by-pass continuation application of International PCT Application No. PCT/KR2021/019646, filed on Dec. 22, 2021, which is based on and claims priority to Korean Patent Application No. 10-2020-0182423, filed on Dec. 23, 2020 in the Korean Intellectual Property Office, the disclosures of which are incorporated by reference herein in their entirety.

BACKGROUND

1. Field

The disclosure relates to a method and a device for predicting, by using a graph neural network (GNN), an event to occur subsequent to a current event from an event sequence.

2. Description of Related Art

Recently, large amounts of data have continuously accumulated, the performance of related hardware such as central processing units (CPUs) has improved, and algorithms that enables self-learning such as deep learning have been developed. Accordingly, interest in devices using machine learning and artificial neural networks has increased.

Training based on big data using machine learning allows for an increased recognition rate or a higher prediction accuracy. Consequently, a device can make decisions similarly to that of a human brain.

Deep learning may also be used for various events. For example, deep learning may be used to predict a future event (or action) in transactions of purchasing and selling products or services in e-commerce. By analyzing an event execution pattern of a user and predicting that an event that will occur to the user, e.g., predicting which action the user will take for an item at a next point in time, relevant information may be recommended to a user, thereby saving time of a user and improving user experience.

Also, an artificial neural network may be used in computation for predicting a next event based on a history of events. A random sampling operation is generally performed on input data to reduce the computational load of prediction computation, but the temporal order of events is not considered in this sampling operation. Predicting a next event without considering the temporal order of events may result in low accuracy of the prediction.

Accordingly, when predicting an event that will occur subsequent to a current event, an artificial neural network technology capable of providing high prediction accuracy is desired.

SUMMARY

Provided are a method and a device capable of increasing the accuracy of predicting a next event to occur by generating a sequence group graph including information about a time-series order of events that occurred, and sampling the sequence group graph based on time-series order information of the events.

The technical objects of the disclosure are not limited to the technical objects described above, and other technical objects may be inferred from the following embodiments.

In accordance with an aspect of the disclosure, there is provided a method of predicting an event to occur, performed by a device. The method includes: identifying a plurality of events that occurred in the device; generating a plurality of sequence graphs based on a time-series order of the plurality of events; generating a sequence group graph by combining the plurality of sequence graphs based on relationships between nodes and edges in the plurality of sequence graphs; obtaining a computation graph by sampling the generated sequence group graph based on time-series order information of the plurality of events; and predicting the event to occur in the device using a graph neural network (GNN) based on the obtained computation graph.

The generating the plurality of sequence graphs includes: identifying first events corresponding to a first sequence, from among the plurality of events; generating a same number of first nodes as a number of the first events; matching the generated first nodes with the first events, respectively; registering a value of each of the first events as a value corresponding to each of the first nodes; connecting the first nodes by first edges based on an order of occurrence of the first events; and registering values indicating a time-series order of the first events as values corresponding to the first edges.

The method further includes: registering, as the value corresponding to each of the first nodes, an indicator value regarding an n-th next node, wherein the indicator value regarding the n-th next node is an indicator value regarding the n-th next node that is subsequent to a preceding node by n hierarchies.

The generating the plurality of sequence graphs includes: identifying first events corresponding to a first sequence and second events corresponding to a second sequence, from among the plurality of events; generating a first sequence graph including first nodes and first edges, from the first events; and generating a second sequence graph including second nodes and second edges, from the second events, and wherein the generating the sequence group graph by combining the plurality of sequence graphs includes: determining the sequence group graph as the first sequence graph; and updating the sequence group graph based on the second sequence graph.

The updating the sequence group graph based on the second sequence graph includes: registering, in response to a second node that matches an existing first node, a value registered in the second node, as a value corresponding to the matching first node, generating, in response to the second node that matches a non-existing first node, the second node as an additional first node, registering, in response to a second edge that matches an existing first edge, a value registered in the second edge, as a value corresponding to the matching first edge, and generating, in response to the second edge that matches a non-existing first edge, the second edge as an additional first edge.

The sequence group graph includes an indicator value regarding an n-th next node as a value corresponding to one of the nodes, wherein the obtaining the computation graph by sampling the sequence group graph based on the time-series order information of the plurality of events includes: determining a reference node indicating a current event; rearranging the sequence group graph based on the reference node; and removing nodes that do not include an indicator value regarding the reference node as an indicator value regarding an n-th next node, from among the nodes that are prior to the reference node by n hierarchies, and wherein n is an integer greater than or equal to 2.

The sequence group graph includes an indicator value regarding an m-th next node as a value corresponding to one of the nodes, wherein the obtaining the computation graph by sampling the sequence group graph based on the time-series order information of the plurality of events includes: determining a reference node indicating a current event; rearranging the sequence group graph based on the reference node; and removing nodes that do not include, as an indicator value regarding an m-th next node, an indicator value regarding at least one of nodes that are prior to the reference node by (n-m) hierarchies, from among the nodes that are prior to the reference node by n hierarchies, and wherein m is an integer greater than or equal to 2 and less than n.

The obtaining the computation graph includes: performing preliminary sampling on the generated sequence group graph based on the time-series order information of the plurality of events; and performing random sampling on the sequence group graph on which the preliminary sampling is performed.

The obtaining the computation graph includes obtaining a first computation graph and a second computation graph that is different from the first computation graph, and wherein the predicting the event to occur in the device includes: predicting a first next event to occur in the device from the first computation graph by using the GNN; predicting a second next event to occur in the device from the second computation graph by using the GNN; and combining the predicted first next event with the predicted second next event, and generating a prediction result with respect to the event to occur in the device.

The GNN is trained to predict the event to occur in the device by using, as input values, user information corresponding to the plurality of events that occurred in the device, current event information, current sequence information, and the computation graph.

In accordance with an aspect of the disclosure, there is provided a device for predicting an event to occur, the device includes: a memory storing a program including one or more instructions; and at least one processor configured to execute the one or more instructions stored in the program to: identify a plurality of events that occurred in the device; generate a plurality of sequence graphs based on a time-series order of the plurality of events; generate a sequence group graph by combining the plurality of sequence graphs based on relationships between nodes and edges in the plurality of sequence graphs; obtain a computation graph by sampling the generated sequence group graph based on time-series order information of the plurality of events; and predict an event to occur in the device using a graph neural network (GNN) based on the obtained computation graph.

The at least one processor is further configured to execute the one or more instructions to: generate the plurality of sequence graphs, by identifying first events corresponding to a first sequence, from among the plurality of events; generate a same number of first nodes as a number of the first events; match each of the generated first nodes with each of the first events; register a value of each of the first events as a value corresponding to each of the first nodes; connect the first nodes by first edges based on an order of occurrence of the first events; and register values indicating a time-series order of the first events as values corresponding to the first edges.

The at least one processor is further configured to execute the one or more instructions to: register, as the value corresponding to each of the first nodes, an indicator value regarding an n-th next node, and wherein the indicator value regarding the n-th next node is an indicator value regarding the n-th next node that is subsequent to a preceding node by n hierarchies.

The at least one processor is further configured to execute the one or more instructions to: generate the plurality of sequence graphs, by identifying first events corresponding to a first sequence and second events corresponding to a second sequence, from among the plurality of events; generate a first sequence graph including first nodes and first edges, from the first events; generate a second sequence graph including second nodes and second edges, from the second events; and combine the first sequence graph and the second sequence graph to generate a sequence group graph by updating the first sequence group graph based on the second sequence graph.

The at least one processor is further configured to execute the one or more instructions to: register, in response to a second node that matches an existing first node, a value registered in the second node, as a value corresponding to the matching first node; generate, in response to the second node that matches a non-existing first node, the second node as an additional first node; register, in response to a second edge that matches an existing first edge, a value registered in the second edge, as a value corresponding to the matching first edge; and generate, in response to the second edge that matches a non-existing first edge, the second edge as an additional first edge.

The sequence group graph includes an indicator value regarding an n-th next node as a value corresponding to one of the nodes, wherein the at least one processor is further configured to execute the one or more instructions to: determine a reference node indicating a current event; rearrange the sequence group graph based on the reference node; and remove nodes that do not include an indicator value regarding the reference node as an indicator value regarding an n-th next node, from among the nodes that are prior to the reference node by n hierarchies, and wherein n is an integer greater than or equal to 2.

The sequence group graph includes an indicator value regarding an m-th next node as a value corresponding to one of the nodes, wherein the at least one processor is further configured to execute the one or more instructions to: determine a reference node indicating a current event; rearrange the sequence group graph based on the reference node; and remove nodes that do not include, as an indicator value regarding an m-th next node, an indicator value regarding at least one of nodes that are prior to the reference node by (n-m) hierarchies, from among nodes that are prior to the reference node by n hierarchies, and wherein m is an integer greater than or equal to 2 and less than n.

The at least one processor is further configured to execute the one or more instructions to: perform preliminary sampling on the generated sequence group graph based on the time-series order information of the plurality of events; and perform random sampling on the sequence group graph on which the preliminary sampling is performed.

The at least one processor is further configured to execute the one or more instructions to: obtain a first computation graph and a second computation graph that is different from the first computation graph; predict a first next event to occur in the device from the first computation graph by using the GNN; predict a second next event to occur in the device from the second computation graph by using the GNN; and combine the predicted first next event with the predicted second next event, and generate a prediction result with respect to the event to occur in the device.

In accordance with an aspect of the disclosure, there is provided a non-transitory computer-readable recording medium having recorded thereon a program for performing the method of predicting an event to occur as described above.

BRIEF DESCRIPTION OF THE DRAWINGS

FIG. 1 is a schematic diagram of a method of predicting an event, according to an embodiment of the disclosure.

FIG. 2 is a flowchart of a method of predicting an event, according to an embodiment of the disclosure.

FIG. 3 is a diagram illustrating events that occurred, according to an embodiment of the disclosure.

FIG. 7 is a diagram illustrating an operation of generating a sequence group graph from a plurality of sequence graphs and obtaining a computation graph by using an indicator value regarding a second next node registered in each node, according to an embodiment of the disclosure.

DETAILED DESCRIPTION

Figure 4:
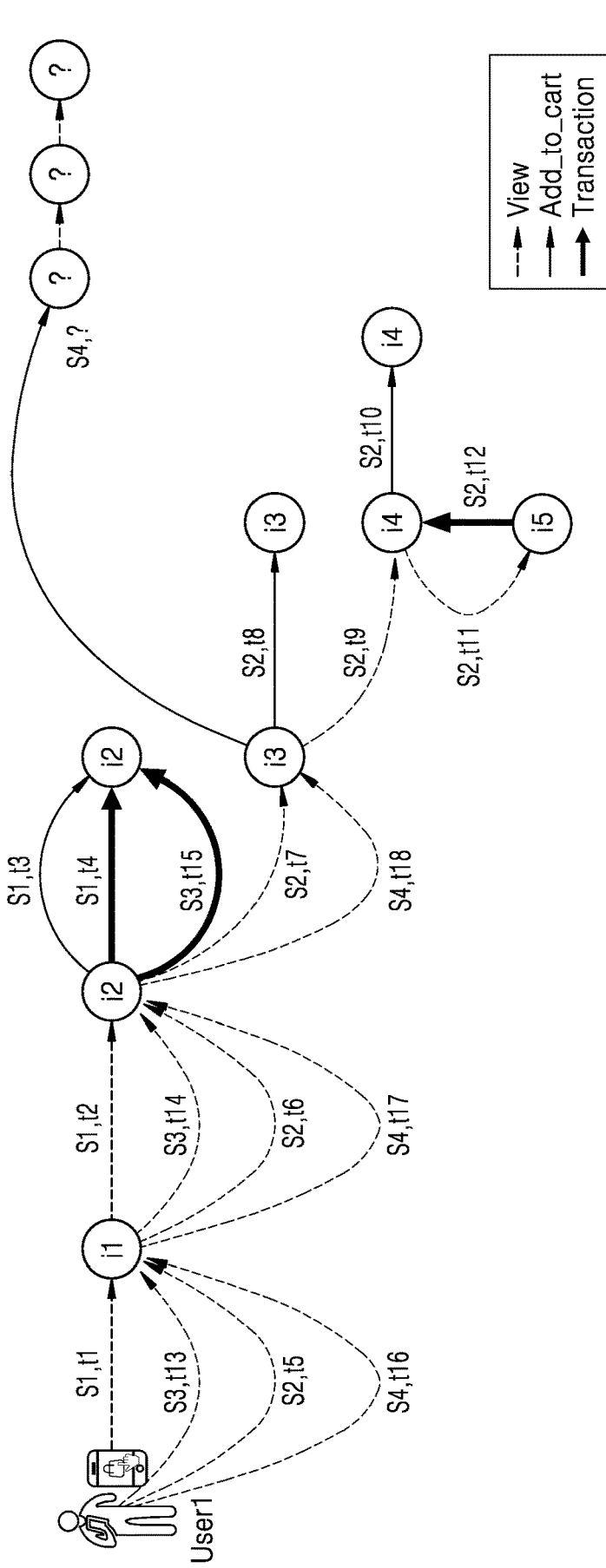
FIG. 4 is a diagram illustrating events that occurred, according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will now be described in detail with reference to the accompanying drawings. However, the embodiments of the disclosure may be embodied in many different forms and should not be construed as being limited to the embodiments of the disclosure set forth herein. In order to clearly describe the disclosure, portions that are not relevant to the description of the disclosure are omitted, and similar reference numerals are assigned to similar elements throughout the present disclosure.

Although the terms used in the embodiments of the disclosure are selected from among common terms that are currently widely used in consideration of their function in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used in the disclosure are not merely designations of the terms, but the terms should be construed based on the meaning of the terms and the context of the disclosure.

The singular expression may include the plural meaning. All terms, including technical and scientific terms, used herein may have the same meaning as commonly understood by one of skill in the art to which the disclosure pertains based on an understanding of the disclosure.

Throughout the disclosure, when a part "includes" an element, it is to be understood that the part may additionally include other elements rather than excluding other elements as long as there is no particular opposing recitation. Also, the terms described in the disclosure, such as " . . . er (or)", " . . . unit", " . . . module", etc., denote a unit that performs at least one function or operation, which may be implemented as hardware or software or a combination thereof.

Throughout the disclosure, it will be understood that when an element is referred to as being "connected to" another element, it may be "directly connected to" the other element or be "electrically connected to" the other element through an intervening element.

The expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a system configured to (or set to)" may mean that the system is "capable of" operating together with another device or other parts. For example, a "processor configured to (or set to) perform A, B, and C" may mean a dedicated processor (e.g., an embedded processor) for performing a corresponding operation or a general-purpose processor (e.g., a central processing unit (CPU) or an application processor) capable of performing corresponding operations by executing one or more software programs stored in a memory.

Functions related to artificial intelligence according to the disclosure are performed by a processor and a memory. The processor may be composed of one or more processors. In this case, the one or more processors may be general-purpose processors such as a CPU, an application processor (AP), or a digital signal processor (DSP), dedicated graphics processors such as a graphics processing unit (GPU), a vision processing unit (VPU), or dedicated artificial intelligence processors such as a neural processing unit (NPU). The one or more processors may perform control to process input data according to predefined operation rules or an artificial intelligence model stored in the memory. Alternatively, in the case where the one or more processors are dedicated artificial intelligence processors, the dedicated artificial intelligence processor may be designed with a hardware structure specialized for processing a specific artificial intelligence model.

The predefined operation rules or artificial intelligence model may be generated via a training process. Being generated via a training process means that the predefined operation rules or artificial intelligence model set to perform desired characteristics (or purposes) is generated by training an initial artificial intelligence model with a learning algorithm by using a large number of training data. The training process may be performed by a device itself on which artificial intelligence according to the disclosure is performed or by a separate server and/or system. Examples of the learning algorithm include, but are not limited to, supervised learning, unsupervised learning, semi-supervised learning, or reinforcement learning.

The artificial intelligence model may include a plurality of neural network layers. Each of the neural network layers includes a plurality of weight values, and performs neural network computation by performing computation on a computation result of a previous layer and the plurality of weight values. The plurality of weight values in each of the neural network layers may be optimized by a result of training the artificial intelligence model. For example, the plurality of weight values may be refined to reduce or minimize a loss or cost value obtained by the artificial intelligence model during the training process. The artificial neural network may be a deep neural network (DNN) and may be, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

An 'event occurred in a device' may be generated by an operation executed in the device by a user input that is input to the device.

Events that occurred in the device may be classified into sequences according to predefined criteria. The sequence may include events that occurred in the device in a temporal order. The predefined criteria for classifying events into sequences may include, for example, whether user inputs are input to different execution windows, whether user inputs are input by different users, whether a time interval between the events that occurred temporally successively exceeds a preset threshold time interval, whether a user input for classifying the events into the sequences is input, whether a screen of the device is switched, or the like. The predefined criteria for classifying events into sequences are not limited to the above-described examples.

In an embodiment of the disclosure, sequences may be grouped into a sequence group to include a plurality of sequences according to predefined criteria. For example, the predefined criteria for grouping sequences into a sequence group may include, but is not limited to, the types of events, the purposes of events, or the like.

A graph is a set of structured information including points (nodes) and lines (edges) connecting the points, and may structurally represent connection relationships between the nodes. The graph may be generated by hierarchically representing the nodes and the relationships between the nodes, and may have a triple structure in which the nodes are connected through the edges. A layer of the graph may represent a hierarchy of the graph. Nodes having the same edge distance from a reference node may be included in the same layer. In an embodiment of the disclosure, a node value corresponding to a node may represent an entity or a property, and an edge value corresponding to an edge may represent a relationship.

A sequence graph is a graph related to one sequence. For example, in the sequence graph, a plurality of events that occurred in a temporal order may be represented by nodes connected by edges in the temporal order. In an embodiment of the disclosure, a timestamp may be assigned to an edge that connects nodes in a sequence graph, to indicate the temporal order of corresponding events. In an embodiment of the disclosure, the sequence graph may have the configuration of a simple linear directed graph. In an embodiment of the disclosure, different sequence graphs may have different lengths. For example, different event sequences may include different numbers of events.

In an embodiment of the disclosure, a timestamp value may be assigned to an edge in the sequence graph described above or a sequence group graph. The timestamp may include a string indicating a time point at which each event included in a corresponding sequence occurs. The timestamp may be conveniently used when comparing two or more time points or calculating a period, and may be expressed in a consistent format. The timestamp may indicate a temporal order in which events occurred, and may not indicate a time point at which the event itself occurred. For example, an event that occurs after one timestamp from a specific event may be referred to as a next event.

Hereinafter, the disclosure will be described in detail with reference to the accompanying drawings.

Figure 1:
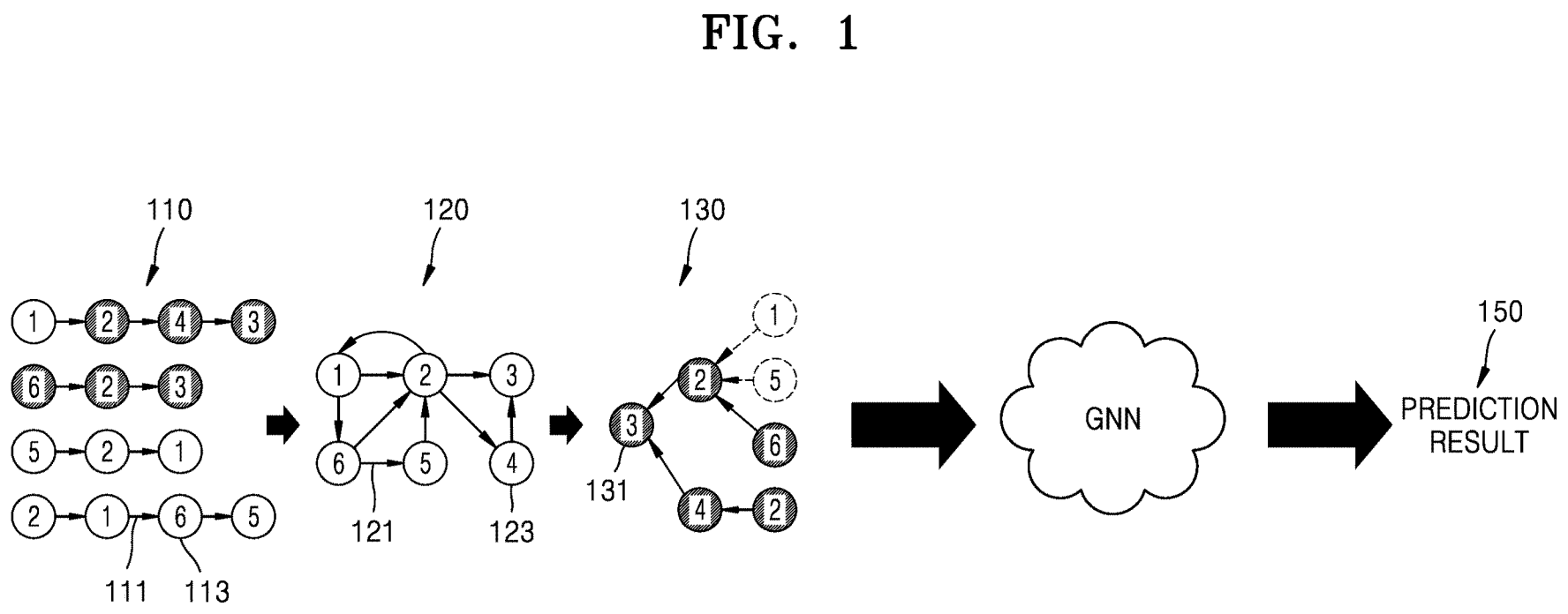

FIG. 1 is a schematic diagram of a method of predicting an event to occur in a device, according to an embodiment of the disclosure.

Referring to FIG. 1, the device may identify events that occurred in the device. The occurred events may be classified into sequences according to predefined criteria. For example, referring to FIG. 1, the events that occurred in the device may be classified into four sequences. For example, a first sequence may include a first event, a second event, a fourth event, and a third event that occurred in a temporal order. For example, a second sequence may include a sixth event, the second event, and the third event that occurred in a temporal order. For example, a third sequence may include a fifth event, the second event, and the first event that occurred in a temporal order. For example, a fourth sequence may include the second event, the first event, the sixth event, and the fifth event that occurred in a temporal order.

In an embodiment of the disclosure, the second event included in all of the first sequence, the second sequence, the third sequence, and the fourth sequence may correspond to a specific operation executed in the device. In an embodiment of the disclosure, a specific event included in a plurality of sequences may correspond to operations having the same attribute that are executed in the device. For example, among operations executed in e-commerce, operations of adding a first product to the cart that occurred at different time points may be events having the same attribute.

Referring to FIG. 1, the device may generate a plurality of sequence graphs 110 for identified events based on a time-series order of events that occurred in the device. In an embodiment of the disclosure, the device may identify events corresponding to the first sequence among a plurality of occurred events. For example, the device may identify the first event, the second event, the fourth event, and the third event corresponding to the first sequence.

The device may generate the same number of nodes 113 as the number of the events corresponding to the first sequence. Referring to FIG. 1, the device may generate four nodes 113 when generating a first sequence graph.

The device may match one event to each of the generated nodes 113. Referring to FIG. 1, when generating the first sequence graph, the device may match the first event, the second event, the third event, and the fourth event to the four generated nodes 113, respectively.

The device may register, as a value corresponding to each node 113, a value regarding the matched event. For example, the device may register, as a value corresponding to a specific node 113, a value regarding the first event matched to the specific node 113, for example, a value regarding information related to a specific operation corresponding to the first event and executed in the device. In an embodiment of the disclosure, the device may additionally register, as a value corresponding to the node 113, an indicator value regarding an n-th next node. The indicator value regarding an n-th next node may refer to an indicator value regarding a node that is subsequent to a specific node in which the indicator value is registered, by n hierarchies.

The device may connect the nodes 113, to which corresponding values are registered, to each other through edges 111 (hereinafter, also referred to as the first, second, and third edges 111) based on the order of occurrence of the events. In an embodiment of the disclosure, the edges 111 may be directed from one node to another node. Referring to FIG. 1, based on the order of occurrence of events, a node 1 in which a value regarding the first event is registered and a node 2 in which a value regarding the second event is registered may be connected to each other by the edge 1 111, the node 2 and a node 4 in which a value regarding the fourth event is registered may be connected to each other by the edge 2 111, and the node 4 and a node 3 in which a value regarding the third event is registered may be connected to each other by the edge 3 111. In an embodiment of the disclosure, the device may register, as values corresponding to edges included in a sequence graph, values indicating the time-series order of events. For example, in FIG. 1, a value indicating the first edge of the first sequence may be registered in the edge 1, a value indicating the second edge of the first sequence may be registered in the edge 2, and a value indicating the third edge of the first sequence may be registered in the edge 3.

In an embodiment of the disclosure, the device may generate a sequence group graph 120 by combining the plurality of sequence graphs 110 with each other, based on the plurality of sequence graphs 110 and the relationships between the nodes 113 and the edges 111 in the plurality of sequence graphs 110. The sequence group graph is a graph representing events in a sequence graph group, and may be generated by integrating the sequence graphs in the sequence graph group.

The sequence group graph 120 may include nodes 123 in which values regarding events are registered and edges 121 in which values regarding the time-series order of the events are registered. In an embodiment of the disclosure, the sequence group graph 120 may include the nodes 113 and the edges 111 included in the plurality of sequence graphs 110.

In an embodiment of the disclosure, the device may identify the events corresponding to the first sequence and events corresponding to the second sequence among the plurality of occurred events. The device may generate the first sequence graph from the events corresponding to the first sequence, and may generate a second sequence graph from the events corresponding to the second sequence. A specific node in the first sequence graph may be referred to as a 'first node', and a specific node in the second sequence graph may be referred to as a 'second node'. A specific edge in the first sequence graph may be referred to as a 'first edge', and a specific edge in the second sequence graph may be referred to as a 'second edge'. The device may determine the sequence group graph as the first sequence graph, and update the sequence group graph by using the second sequence graph. In an embodiment of the disclosure, an operation of updating the sequence group graph by using the second sequence graph may include, in the case where a first node that matches a second node included in the second sequence graph is included in the sequence group graph, additionally registering, as a value corresponding to the matching first node, a value registered in the second node, in the case where the first node that matches the second node is not included in the sequence group graph, additionally generating, in the sequence group graph, the corresponding second node, in the case where a first edge that matches a second edge included in the second sequence graph is included in the sequence group graph, additionally registering, as a value corresponding to the matching first edge, a value registered in the second edge, and, in the case where the first edge that matched the second edge is not included in the sequence group graph, additionally generating, in the sequence group graph, the corresponding second edge.

For example, referring to FIG. 1, the device may initially determine the first sequence graph 1-2-4-3 as a sequence group graph 120. When a node 2 is included in the first sequence graph 1-2-4-3 and the second sequence graph 6-2-3 among the plurality of sequence graphs 110, the sequence group graph 120 may be updated such that other nodes in the second sequence graph (e.g., a node 6 and a node 3) are additionally registered. That is, the node 2 in the first sequence graph and the second sequence graph may be connected to other nodes through the edges indicated in the first sequence graph or the second sequence graph. For example, in the updated sequence group graph 120, the node 2 may be connected to the node 1 and the node 4 (according to the first sequence graph), and may be additionally connected to the node 6 and the node 3 (according to the second sequence graph). When the nodes of the first sequence graph and the second sequence graph are connected, the edges 111 represented in the first sequence graph or the second sequence graph may still indicate the same relationship between each node in the sequence group graph 120. For example, a temporal order in which the events of the second sequence graph occurs is node 6, node 2, and node 3. This temporal relationship may be represented the same in the updated sequence group graph 120.

Referring back to FIG. 1, the device may generate the sequence group graph 120, for example, by combining the first sequence graph 1-2-4-3, the second sequence graph 6-2-3, a third sequence graph 5-2-1, and a fourth sequence graph 2-1-6-5 with each other. In an embodiment of the disclosure, the sequence group graph 120 may include the nodes 113 and the edges 111 included in the plurality of sequence graphs 110.

In an embodiment of the disclosure, the device may sample the generated sequence group graph 120 based on the time-series order of the identified events. Referring to FIG. 1, when a current event is determined, the sequence group graph 120 may be rearranged based on a reference node 131 corresponding to the current event, and the rearranged sequence group graph may be sampled. For example, the sampling operation may include an operation of removing nodes (e.g., node 1 and node 5) that do not include an indicator value regarding the reference node 131 as an indicator value regarding a second next node, from among nodes (e.g., node 1, node 5, node 6, and node 2) that are prior to the reference node 131 by two hierarchies. In an embodiment of the disclosure, the sampling operation may be performed considering the time-series order of the events by using the indicator value regarding an n-th next node registered in each node included in the sequence group graph 120. The sampling operation will be described in more detail with reference to FIG. 7.

In an embodiment of the disclosure, the device may obtain a computation graph for predicting an event to occur next in the time domain of a current occurred event by sampling the sequence group graph 120 by using the indicator value regarding an n-th next node registered in each node. For example, the computation graph may be input to a graph neural network GNN. The graph neural network GNN may output a prediction result 150 from the input computation graph. For example, the prediction result 150 may include a result of predicting an event to occur subsequent to the current occurred event corresponding to the reference node 131. In an embodiment of the disclosure, the prediction result 150 on the next event may include a value regarding at least one event to occur in the device.

In a method, performed by a device, of predicting an event to occur in the device according to the disclosure, an artificial neural network model using the sequence group graph 120 may be used as a method of inferring or predicting a next event to occur. A processor of the device may perform a preprocessing operation on the sequence group graph 120 to convert the sequence group graph 120 into a form suitable for use as an input of the artificial neural network model. The artificial neural network model may be generated via a training process. Here, "being generated" via a training process means that predefined operation rules or artificial intelligence model set to perform intended features is generated by training a basic artificial intelligence model with a learning algorithm by using a large number of training data. The artificial neural network model may include a plurality of neural network layers. Each of the neural network layers may include a plurality of weight values, and may perform neural network computation by performing computation on a computation result of a previous layer and the plurality of weight values.

Inference/prediction may refer to judging or determining information for logical inference and prediction, and includes knowledge-based reasoning, preference-based planning, recommendation, or the like.

The processor of the device may predict the next event to occur in the device by using the sequence group graph 120 generated based on the events that occurred in the device. An artificial neural network including a graph neural network (GNN) may be used to predict the next event.

The graph neural network (GNN) is a type of artificial neural network, and input data to the GNN may have a graph structure. The GNN may be used for prediction operations at the node level, at the edge level, or at the graph level. At the node level, the GNN may be used for a node classification operation. For example, in the case where only some nodes of a graph are labeled, other unlabeled nodes may be classified by training a GNN. At the edge level, the GNN may be used for a link prediction operation. For example, a relationship between nodes of a graph may be determined, and a correlation between two nodes may be predicted. Also, as described in the disclosure, it is possible to predict which node the current node will be next connected to by an edge and which information the node has. At the graph level, the GNN may be used for a graph classification operation. For example, the GNN may be used to classify an entire graph into various categories, and, for example, may be used to classify molecules into various categories according to molecular structures.

The GNN may be used to obtain a predicted future value. The GNN may model complex nonlinear relationships like a general artificial neural network. For example, the GNN is suitable for processing relationships or interactions between events, and may be used for researching and modeling social networks with relationships, media influences, transmission of viruses, electronic commercial transactions, or the like. The GNN may include, for example, a recurrent graph neural network (RGNN), a spatial convolutional network (SCN), or a spectral convolutional network (SCN). The GNN may update (learn) a state of each node by using a connection relationship and states of neighbors, and may perform a prediction task by using a final state. Here, the final state may be referred to as 'node embedding'.

In an embodiment of the disclosure, the graph neural network GNN may be trained to predict an event to occur subsequent to the current event by using, as input values, information about the current event, information about a sequence in which the current event is included, user information of the device, and the obtained computation graph.

For example, in e-commerce through a device, in the case where the current event is that a user is viewing Item No. 3 (shown in FIG. 3), user information, current sequence information related to events that occurred before an operation of viewing Item No. 3 in a current sequence, current event information about the operation of viewing Item No. 3, and a computation graph obtained from identified events may be used to predict which operation (e.g., view, add to the cart, or purchase) the user will perform with respect to which item at a next time point.

FIG. 2 is a flowchart of a method of predicting an event to occur in the device, according to an embodiment of the disclosure.

In operation S210, events that occurred in the device may be identified. An event may occur by an operation executed in the device by a user input that is input to the device. The events that occurred in the device may be classified into sequences according to the predefined criteria. The sequence may include events that occurred in the device in a temporal order. The sequence group may include at least one sequence.

In an embodiment of the disclosure, all events included in the sequence group may correspond to the same user. In this case, a sequence group graph generated based on the corresponding sequence group may be personalized. An event predicted by using the personalized sequence group graph may have high prediction accuracy.

In an embodiment of the disclosure, at least one event included in a sequence group may correspond to a user, and a current sequence in which a current occurred event is included may correspond to another user. In this case, user information may be used to select events to be used for generating a sequence group graph among a plurality of events included in the sequence group. For example, from among various users, a user whose age, gender, event history, and preference are identical or similar to those of a current user corresponding to the current occurred event may be selected, and events occurred by the selected user may be selected for generating the sequence group graph.

In operation S220, a plurality of sequence graphs for the identified events may be generated based on the time-series order of occurred events. In an embodiment of the disclosure, an operation of generating the plurality of sequence graphs may include an operation of identifying first events in a first sequence from among a plurality of occurred events, an operation of generating the same number of nodes as the number of the first events, an operation of matching each of the generated nodes with one first event, an operation of registering, as a value corresponding to each node, a value regarding the matched first event, an operation of connecting the nodes by edges based on an order in which the first events occurred, and an operation of registering, as a value corresponding to each edge, a value indicating a time-series order of the first events.

In an embodiment of the disclosure, an operation of additionally registering, as a value corresponding to each node, an indicator value regarding an n-th next node may be further included. The indicator value regarding an n-th next node may refer to an indicator value regarding a node that is subsequent to the node in which the indicator value is registered, by n hierarchies.

In operation S230, the sequence group graph may be generated by combining the plurality of sequence graphs with each other. In an embodiment of the disclosure, an operation of combining the sequence graphs with each other may be performed based on relationships between the nodes and the edges in the plurality of sequence graphs. For example, an operation of generating the sequence group graph by combining a first sequence graph and a second sequence graph with each other may include an operation of determining the sequence group graph as the first sequence graph, and an operation of updating the sequence group graph by using the second sequence graph.

In an embodiment of the disclosure, the operation of updating the sequence group graph determined as the first sequence graph by using the second sequence graph may include, an operation of, in the case where a first node that matches a second node included in the second sequence graph is included in the sequence group graph, additionally registering, as a value corresponding to the matching first node, a value registered in the second node, and an operation of, in the case where the first node that matches the second node is not included in the sequence group graph, additionally generating, in the sequence group graph, the corresponding second node. The operation of updating may further include an operation of, in the case where a first edge that matches a second edge included in the second sequence graph is included in the sequence group graph, additionally registering, as a value corresponding to the matching first edge, a value registered in the second edge, and an operation of, in the case where the first edge that matched the second edge is not included in the sequence group graph, additionally generating, in the sequence group graph, the corresponding second edge.

In an embodiment of the disclosure, the device may include, as a value corresponding to each of the nodes included in the sequence group graph, an indicator value regarding an n-th next node. The indicator value regarding an n-th next node may refer to an indicator value regarding a node that is subsequent to a specific node in which the indicator value is registered, by n hierarchies. In an embodiment of the disclosure, n may be an integer greater than or equal to 2.

In operation S240, a computation graph may be obtained by sampling the generated sequence group graph based on time-series order information of the events. In an embodiment of the disclosure, the generated sequence group graph may be sampled based on the time-series order of the events included therein, and the computation graph for predicting an event to occur subsequent to the current occurred event may be obtained through the sampling.

In an embodiment of the disclosure, the sequence group graph may include an indicator value regarding an n-th next node as a value corresponding to each of the nodes included therein, and the device may sample the sequence group graph by using the indicator value regarding the n-th next node included in each of the nodes. For example, an operation of obtaining the computation graph by sampling the sequence group graph based on the time-series order information of the events may include an operation of determining the reference node indicating the current occurred event, an operation of rearranging the sequence group graph based on the determined reference node, and an operation of removing nodes that do not include an indicator value regarding the reference node as an indicator value regarding an n-th next node, from among nodes that are prior to the reference node by n hierarchies. Here, n may be an integer greater than or equal to 2.

For example, in the case of n being 2, the sequence group graph may include, as a value corresponding to each node, an indicator value regarding a second next node. A layer in the sequence group graph may correspond to a timestamp in the time domain. Accordingly, each node may include information related to an event after two timestamps from a corresponding event. The device may remove, from among nodes that are prior to the reference node by two hierarchies in the generated sequence group graph, nodes that do not include, as an indicator value regarding a second next node, the indicator value regarding the reference node. When a node includes, as an indicator value regarding a second next node, the indicator value regarding the reference node, a path from the event corresponding to the node to the current event corresponding to the reference node may have a distance of, for example 2 timestamps in the time domain. Accordingly, by removing, from among the nodes that are prior to the reference node by two hierarchies, the nodes that do not include, as an indicator value regarding a second next node, the indicator value regarding the reference node, substantially irrelevant events may be removed.

In an embodiment of the disclosure, by using the indicator value regarding an n-th next node in the sampling, a precedence relationship between events that occurred at an interval of n timestamps on the time domain may be considered. Therefore, in the sampling operation based on the indicator value regarding an n-th next node, not only connection relationships between the nodes but also the order of the nodes in the time domain may be considered. An operation of sampling the sequence group graph based on the indicator value regarding an n-th next node will be described in more detail with reference to FIG. 7.

In an embodiment of the disclosure, similar to the example described above, the sequence group graph may include, as a value corresponding to each node included therein, an indicator value regarding an m-th next node, and the device may sample the sequence group graph by using the indicator values regarding m-th next nodes included in the nodes. For example, the operation of obtaining the computation graph by sampling the sequence group graph based on the time-series order information of the events may include an operation of determining the reference node indicating the current occurred event, an operation of rearranging the sequence group graph based on the determined reference node, and an operation of removing nodes that do not include, as an indicator value regarding an m-th next node, an indicator value regarding at least one of nodes that are prior to the reference node by (n-m) hierarchies, from among nodes that are prior to the reference node by n hierarchies. Here, m may be an integer greater than or equal to 2 and less than n.

For example, in the case where m is 2 and n is 3, the sequence group graph may include, as a value corresponding to each node, an indicator value regarding a second next node. A layer in the sequence group graph may correspond to a timestamp in the time domain. Accordingly, each node may include information related to an event after two timestamps from a corresponding event. The device may remove, from among nodes that are prior to the reference node by three hierarchies in the generated sequence group graph, nodes that do not include, as an indicator value regarding an m-th next node, an indicator value regarding at least one of nodes that are prior to the reference node by one (3−2=1) hierarchy. When a node includes, as an indicator value regarding a second next node, the indicator value regarding the reference node may mean that a path from the event corresponding to a node to the current event corresponding to the reference node may have a distance of 2 timestamps in the time domain. Accordingly, by removing, from among the nodes that are prior to the reference node by three hierarchies, the nodes that do not include, as an indicator value regarding an m-th next node, the indicator value regarding at least one of nodes that are prior to the reference node by one hierarchy, substantially irrelevant (pathless) events may be removed.

In an embodiment of the disclosure, by using the indicator value regarding an m-th next node in the sampling, a precedence relationship between events that occurred at an interval of m timestamps on the time domain may be considered. Therefore, in the sampling operation based on the indicator value regarding an m-th next node, not only connection relationships between the nodes, but also the order of the nodes in the time domain may be considered. An operation of removing some nodes from among nodes that are prior to the reference node by n hierarchies and sampling the sequence group graph based on the indicator value regarding an m-th next node will be described in more detail with reference to FIG. 8.

In an embodiment of the disclosure, the device may perform the sampling operation based on indicator values regarding second to m-th nodes respectively stored in the nodes included in the generated sequence group graph. For example, an operation of sampling the sequence group graph having n hierarchies may include an operation of performing sampling in a stepwise manner based on an indicator value regarding an m1-th node and an indicator value regarding an m2-th node, wherein m1 and m2 are different from each other.

In an embodiment of the disclosure, an operation performed by the device for obtaining the computation graph may include an operation of performing preliminary sampling on the generated sequence group graph based on the time-series order information of the identified events as described above, and an operation of performing secondary sampling on the sequence group graph on which the preliminary sampling is performed, based on random sampling. In an embodiment of the disclosure, the operation of obtaining the computation graph may include an operation of sampling in a stepwise manner. In this case, the number of nodes included in the computation graph may be reduced, and the computational load in predicting a next event by using the graph neural network GNN may be reduced.

In operation S250, a next event to occur in the device may be predicted from the obtained computation graph by using the graph neural network GNN. In an embodiment of the disclosure, the obtained computation graph may be input to the graph neural network GNN to obtain a result of predicting a next event as an output value.

In an embodiment of the disclosure, by sampling the sequence group graph to obtain the computation graph, the obtained computation graph may have a lower complexity and a reduced size of data compared to the sequence group graph. Due to the characteristics of the graph structure, the numbers of nodes and edges exponentially increases as the number of layers increases. Therefore, instead of inputting a graph to a neural network as the sequence group graph, the sequence group graph may be sampled to generate the sampled graph (or the computation graph) and may be input to the neural network in order to reduce the computational load of prediction computation. Accordingly, in the case where the computation graph obtained by sampling the sequence group graph according to an embodiment of the disclosure is used for a subsequent operation, the complexity of computation may be reduced, and a computation result may be obtained more rapidly.

In an embodiment of the disclosure, the device may predict a first next event to occur in the device from an obtained first computation graph by using a graph neural network, and may predict a second next event to occur in the device from an obtained second computation graph by using the graph neural network. Thereafter, the device may combine the predicted first next event with the predicted second next event to generate a result of predicting an event to occur in the device. In an embodiment of the disclosure, the device may further enhance the prediction accuracy by combining a plurality of predicted next events with each other to generate one prediction result.

In an embodiment of the disclosure, the graph neural network GNN may be trained to predict a next event to occur in the device by using user information corresponding to an occurred event, current event information, current sequence information, and an obtained computation graph, as input values.

For example, events may include operations executed on a device on e-commerce. For example, the events may include, but are not limited to, an operation of viewing a product, an operation of adding a product to the cart, and an operation of purchasing a product, which are executed in the device by a user input.

For example, the events may include operations executed in a mobile communication device. For example, the events may include, but are not limited to, an operation of executing an application, an operation of installing an application, and an operation of removing an application, which are executed in the mobile communication device by a user input. The events according to an embodiment of the disclosure may include all types of events that are performed with a series of sequences.

FIGS. 3, 4, 5A, 5B, and 5C are diagrams illustrating a series of operations in which the device identifies events that occurred in the device (FIGS. 3 and 4), generates a plurality of sequence graphs for the identified events based on a time-series order of the generated events (FIG. 5A), generates a sequence group graph by combining the plurality of sequence graphs with each other (FIG. 5B), and obtains a computation graph by sampling the generated sequence group graph (FIG. 5C), according to an embodiment of the disclosure.

Figure 3:
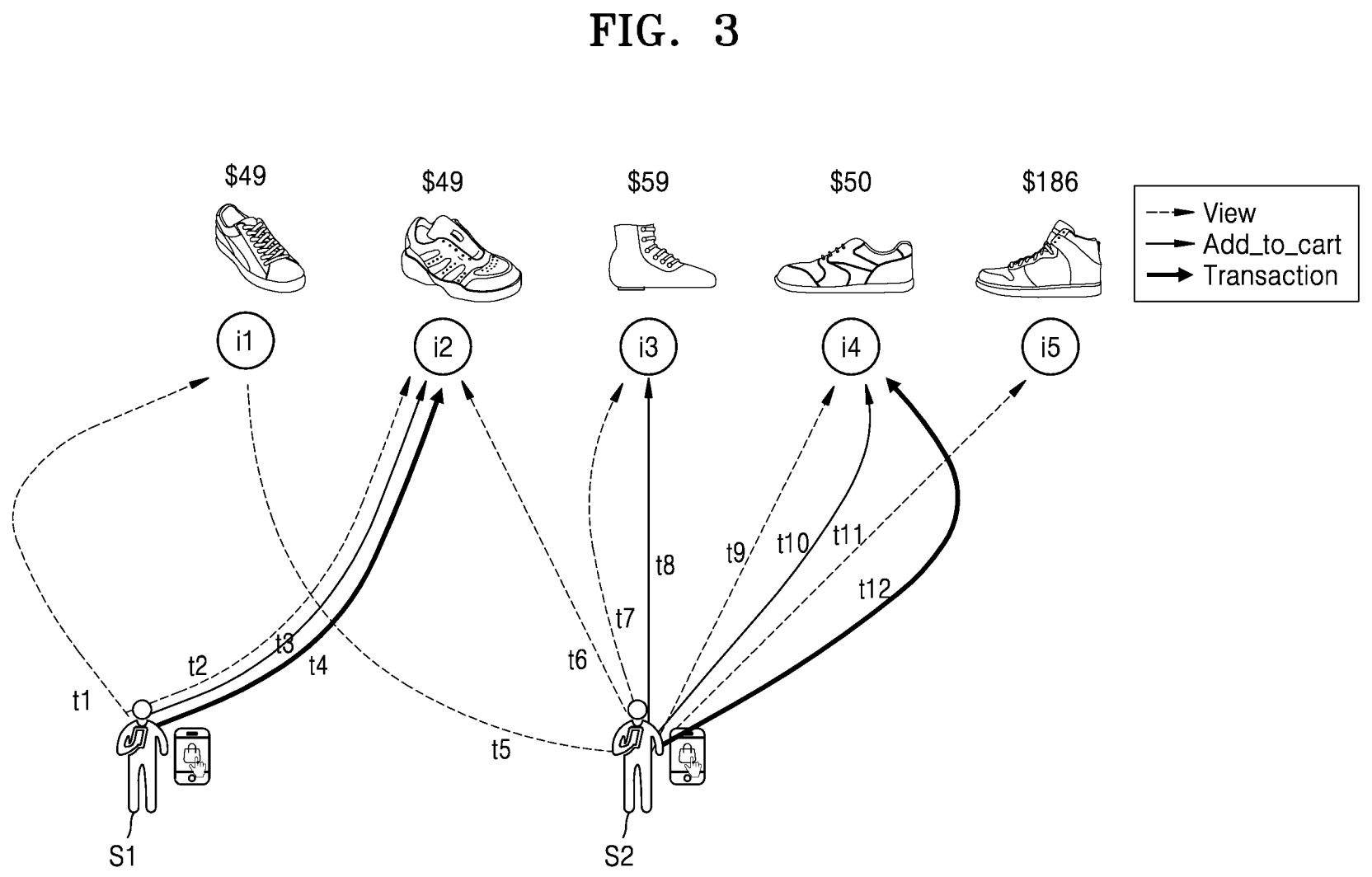

FIG. 3 is a diagram illustrating the events that occurred in the device, according to an embodiment of the disclosure.

The events that occurred in the device may have occurred in a time-series order. Hereinafter, for convenience of description, an event corresponding to an n-th timestamp on the time domain may be in the format of 'n-th event (target object, operation, time of occurrence)'.

Referring to FIG. 3, with respect to events occurring in e-commerce, a first sequence S1 may include four events. Specifically, the first sequence S1 may include a first event (i1, view, t1) of viewing a first item i1, a second event (i2, view, t2) of viewing a second item i2, a third event (i2, add_to_cart, t3) of adding the second item i2 to the cart, and a fourth event (i2, transaction, t4) of purchasing the second item i2.

In addition, referring to FIG. 3, a second sequence S2 may include eight events. Specifically, the second sequence S2 may include a fifth event (i1, view, t5) of viewing the first item i1, a sixth event (i2, view, t6) of viewing the second item i2, a seventh event (i3, view, t7) of viewing a third item i3, an eighth event (i3, add_to_cart, t8) of adding the third item i3 to the cart, a ninth event (i4, view, t9) of viewing a fourth item i4, a tenth event (i4, add_to_cart, t10) of adding the fourth item i4 to the cart, an eleventh event (i5, view, t11) of viewing a fifth item i5, and a twelfth event (i4, transaction, t12) of purchasing the fourth item i4.

In an embodiment of the disclosure, both of the first sequence S1 and the second sequence S2 may correspond to the same user. For example, a specific user may have compared the first item i1 with the second item i2 and then purchased the second item i2 in the first sequence S1. Thereafter, in the second sequence S2, the specific user may compare the first item i1 to the fifth item i5 with each other and then purchase the fourth item i4 rather than the second item i2 that was purchased in the first sequence S1. This may mean that the satisfaction with the second item i2 is low or that the user did not purchase the second item i2 again because he/she already had the product. Alternatively, for example, the user may open two windows (e.g., Explorer) on the device, execute the first sequence S1 on one window, and execute the second sequence S2 on the other window. This may refer to the case where the user purchases two items i2 and i4 after comparing the first item i1 to the fifth item i5 with each other.

In an embodiment of the disclosure, the first sequence S1 and the second sequence S2 may correspond to two users. For example, a first user may purchase the second item i2 after comparing the first item i1 with the second item i2, and a second user may purchase the fourth item i4 after comparing the first item i1 to the fifth item i5 with each other. This may indicate preferences on items according to the users.

FIG. 4 is a diagram illustrating an operation of identifying events that occurred in the device, according to an embodiment of the disclosure.

FIG. 4 schematically illustrates of the first sequence S1 and the second sequence S2 illustrated in FIG. 3. In FIG. 4, products that are subject to operations of viewing, adding to the cart, purchasing, etc., are represented by the circles, and type information of the operations performed on specific products are represented by the types of arrows. In addition, sequence information and timestamp information about the operations are indicated on the corresponding arrows. Referring to FIG. 4, the events that occurred in the device may further include events classified into a third sequence S3 and a fourth sequence S4 in addition to the first sequence S1 and the second sequence S2 corresponding to those in FIG. 3.

Referring to FIG. 4, the third sequence S3 may include three events. Specifically, the third sequence S3 may include a thirteenth event (i1, view, t13) of viewing the first item i1, a fourteenth event (i2, view, t14) of viewing the second item i2, and a fifteenth event (i2, transaction, t15) of purchasing the second item i2.

Referring to FIG. 4, the fourth sequence S4 may include three events. Specifically, the fourth sequence S4 may include a sixteenth event (i1, view, t16) of viewing the first item i1, a seventeenth event (i2, view, t17) of viewing the second item i2, and an eighteenth event (i3, view, t18) of viewing the third item i3.

As described above, the device may identify the events that occurred in the device, and may classify the identified events into a plurality of sequences according to the pre-defined criteria.

For example, the current occurred event may correspond to the eighteenth event. In this case, the device may predict a next event to occur in the device after the eighteenth event through operations illustrated in FIGS. 5A to 5C that will be described below.

Figure 5A:
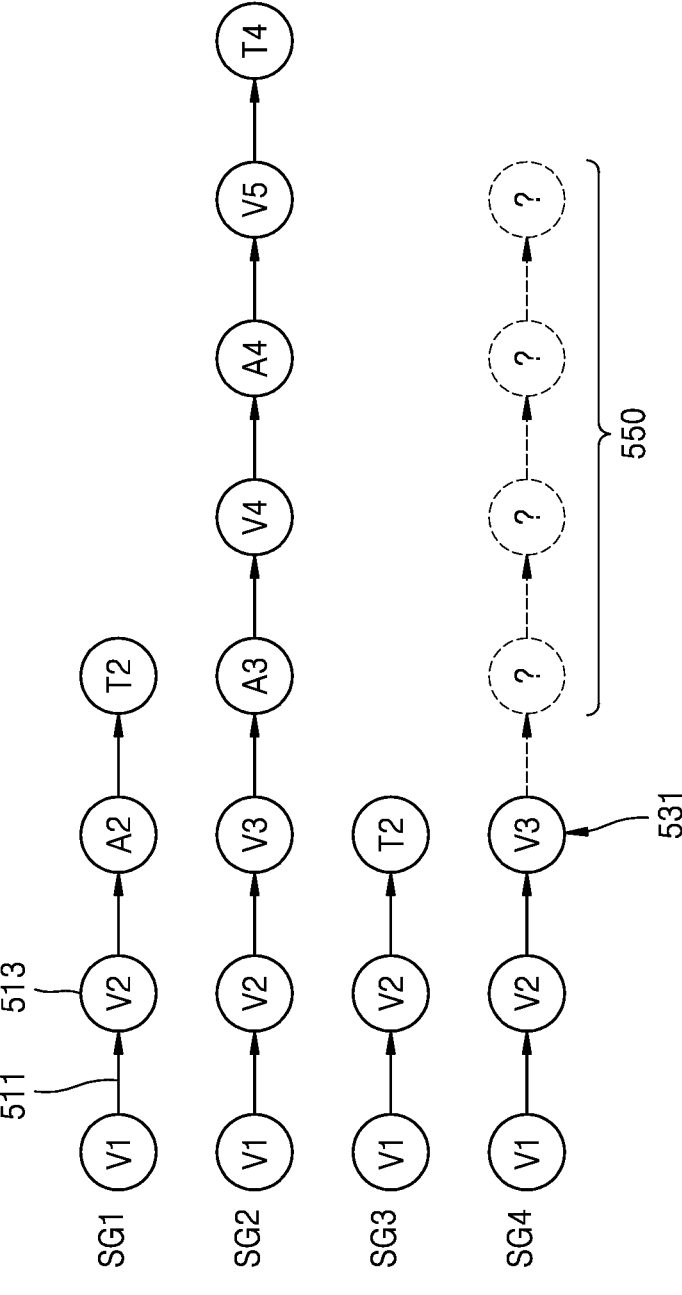
FIG. 5A is a diagram illustrating an operation of generating a plurality of sequence graphs related to events, according to an embodiment of the disclosure.

FIG. 5A is a diagram illustrating an operation of generating a plurality of sequence graphs SG1, SG2, SG3, and SG4 regarding events, according to an embodiment of the disclosure.

In an embodiment of the disclosure, the device may identify the events illustrated in FIG. 4 and may generate the plurality of sequence graphs SG1, SG2, SG3, and SG4 regarding the identified events based on a time-series order of the occurred events.

For example, in the generating of the first sequence graph SG1, the events corresponding to the first sequence (i.e., the first to fourth events) may be identified from among the plurality of occurred events. The device may generate the same number of nodes as the number of the identified events corresponding to the first sequence. In the example, because four events are included in the first sequence, four nodes 513 may be included in the first sequence graph SG1.

In an embodiment of the disclosure, one event may be matched to each of the generated nodes 513, and a value regarding one matched event may be registered as a value corresponding to each of the nodes 513. For example, in a first node V1, values in the data structure as shown in Table 1 below regarding the event of viewing the first item i1 at the time t1 may be registered.

TABLE 1

| Sequence number | Event type | Time of occurrence of event | Indicator value regarding second next node | Indicator value regarding third next node | . . . |
|---|---|---|---|---|---|
| S1 | (i1, view) | t1 | A2 | T2 | . . . |

In an embodiment of the disclosure, the node may further include an indicator value regarding an n-th next node. Here, n may be an integer greater than or equal to 2. In the example, in the first sequence graph, because the first node V1 has a third node A2 as a second next node, the first node V1 may further include an indicator value regarding the third node A2 as a registered value. In addition, because the first node V1 has a fourth node T2 as a third next node, the first node V1 may further include an indicator value regarding the fourth node T2 as a registered value. A node may include an indicator value regarding an n-th next node as a registered value, with respect to at least one n.

For example, in a similar manner, values regarding an event of viewing the second item i2 at the time t2 may be registered in the second node V2. Values regarding an event of adding the second item i2 to the cart at the time t3 may be registered in the third node A2. Values regarding an event of purchasing the second item i2 at the time t4 may be registered in the fourth node T2.

In an embodiment of the disclosure, the device may connect the generated nodes by edges based on the order of occurrence of the events. In the example, the nodes V1, V2, A2, and T2 may be connected in this order.

In an embodiment of the disclosure, the device may register, as values corresponding to generated edges, values indicating a time-series order in which the events occurred. In the example, in a first edge connecting the node V1 to the node V2, a value regarding directionality from the node V1 to the node V2 and values in the data structure as shown in Table 2 below indicating the first edge of the first sequence may be registered.

TABLE 2

| Sequence number | Source node | Destination node | Serial number of node |
|---|---|---|---|
| S1 | V1 | V2 | 1st |

For example, in a similar manner, a value regarding a second edge from V2 to A2 may be registered in the second edge, and a value regarding a third edge from A2 to T2 may be registered in the third edge.

The second sequence graph SG2, the third sequence graph SG3, and the fourth sequence graph SG4 may be generated in a similar manner.

In an embodiment of the disclosure, a value regarding a currently last occurred event may be registered in a third node V3 of the fourth sequence graph SG4. In this case, the third node V3 of the fourth sequence graph SG4 as the current event may be a reference node 531 when generating a computation graph in FIG. 5C, that will be described below. The device may predict a next event 550 to occur at a time point on the time domain, subsequent to the current event corresponding to the reference node 531.

Figure 5B:
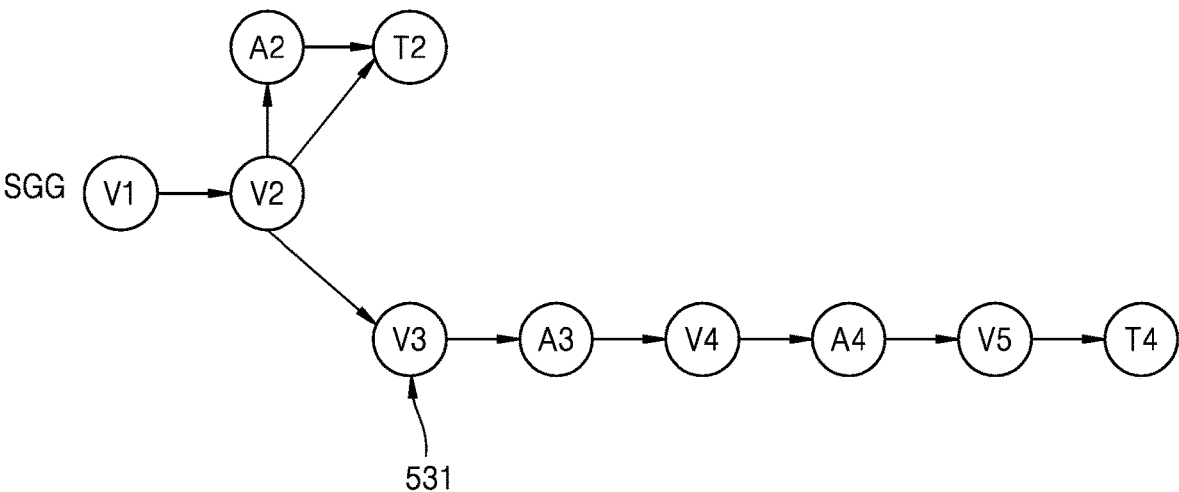
FIG. 5B is a diagram illustrating an operation of generating a sequence group graph by combining a plurality of sequence graphs, according to an embodiment of the disclosure.

FIG. 5B is a diagram illustrating an operation of generating a sequence group graph SGG by combining the plurality of sequence graphs SG1, SG2, SG3, and SG4 with each other, according to an embodiment of the disclosure.

In an embodiment of the disclosure, the device may generate the sequence group graph SGG by combining the plurality of sequence graphs generated in FIG. 5A as described above with each other based on relationships between the nodes 513 and edges 511 in the plurality of sequence graphs. For example, based on one of the plurality of sequence graphs, the device may update nodes and edges of a reference sequence graph based on nodes and edges of other sequence graphs.

For example, the node V1 of FIG. 5B may include all of values registered in the node V1 in the first sequence graph SG1, values registered in the node V1 in the second sequence graph SG2, values registered in the node V1 in the third sequence graph SG3, and values registered in the node V4 in the fourth sequence graph SG4. For example, in the node V1 of FIG. 5B, values in the data structure as shown in Table 3 below may be registered.

TABLE 3

| Sequence number | Event type | Time of occurrence of event | Indicator value regarding second next node | Indicator value regarding third next node | |
|---|---|---|---|---|---|
| S1 | (i1, view) | t1 | A2 | T2 | . . . |
| S2 | (i1, view) | t5 | V3 | A3 | . . . |
| S3 | (i1, view) | t13 | T2 | — | . . . |
| S4 | (i1, view) | t16 | V3 | — | . . . |

Corresponding values may be stored in other nodes in a similar manner.

For example, in FIG. 5B, an edge connecting the node V1 to the node V2 may include all of values registered in an edge connecting the node V1 to the node V2 in the first sequence graph SG1, values registered in an edge connecting the node V1 to the node V2 in the second sequence graph SG2, values registered in an edge connecting the node V1 to the node V2 in the third sequence graph SG3, and values registered in an edge connecting the node V1 to the node V2 in the fourth sequence graph SG4. For example, values in the data structure as shown in Table 4 below may be registered in the edge connecting the node V1 to the node V2 of FIG. 5B.

TABLE 4

| Sequence number | Source node | Destination node | Serial number of node |
|---|---|---|---|
| S1 | V1 | V2 | 1st |
| S2 | V1 | V2 | 1st |
| S3 | V1 | V2 | 1st |
| S4 | V1 | V2 | 1st |

Corresponding values may be stored in other edges in a similar manner.

Figure 5C:
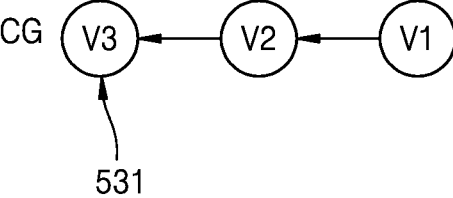
FIG. 5C is a diagram illustrating an operation of obtaining a computation graph by sampling a sequence group graph, according to an embodiment of the disclosure.

FIG. 5C is a diagram illustrating an operation of obtaining a computation graph CG by sampling the sequence group graph SGG, according to an embodiment of the disclosure.

In an embodiment of the disclosure, the device may determine the reference node 531 indicating the current event, rearrange the sequence group graph SGG based on the reference node 531, and remove nodes that do not include, as an indicator value regarding an n-th next node, an indicator value regarding the reference node 531, from among nodes that are prior to the reference node 531 by n hierarchies.

Referring to FIG. 5C, the reference node 531 indicating the current event may be determined as the node V3. In this case, nodes that are subsequent to the node V3 may be removed, and the sequence group graph SGG may be rearranged based on edges that arrives at the node V3. Thereafter, from among the nodes that are prior to the reference node 531 by n hierarchies, the nodes that do not include, as an indicator value regarding an n-th next node, the indicator value regarding the reference node 531 may be removed. In an embodiment of the disclosure, the rearranged sequence group graph includes only three hierarchies. Accordingly, the sampling may be performed only in the case where n is 2.

For example, in the case where n is 2, only the node V1 is prior to the reference node 531 by two hierarchies. In the example, an indicator value regarding a second next node registered in the node V1 may include indicator values regarding the nodes {A2, V3, T2}. Accordingly, the computation graph CG may be determined as a graph (V3←V2←V1) obtained by performing an operation of removing nodes that do not include, as an indicator value regarding a second next node, an indicator value regarding the reference node 531, from among nodes that are prior to the reference node 531 by two hierarchies.

In an embodiment of the disclosure, the device may predict a next event to occur subsequent to the current event corresponding to the reference node 531 by inputting the computation graph CG obtained by performing the method described above to the graph neural network GNN.

Figure 6:
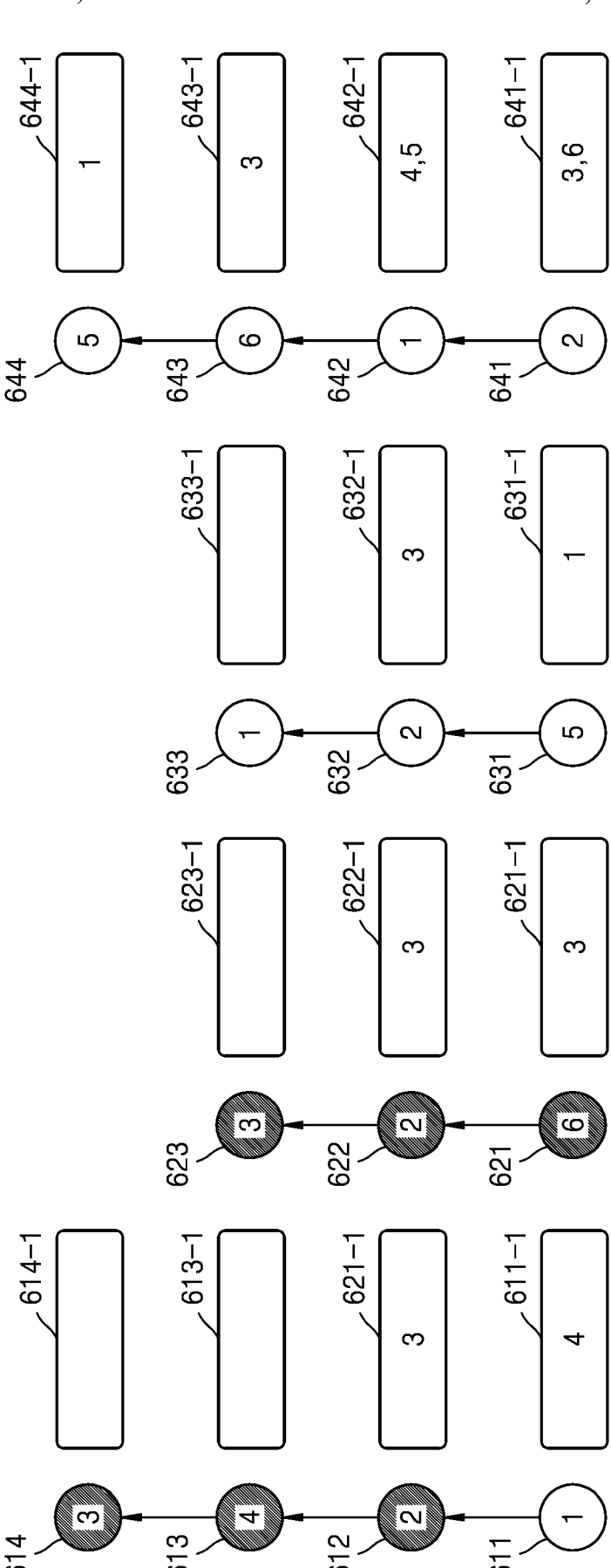
FIG. 6 is a diagram illustrating an operation of registering, in each node included in a plurality of sequence graphs, an indicator value regarding a corresponding second next node, according to an embodiment of the disclosure.

FIG. 6 is a diagram illustrating an operation of registering, in each node included in the plurality of sequence graphs, an indicator value regarding a corresponding second next node, according to an embodiment of the disclosure.

In an embodiment of the disclosure, in the operation of generating a sequence group graph based on a plurality of events, the device may obtain information about a second next node corresponding to each node, from the plurality of events, and register, in each node, an indicator value regarding an obtained second next node. A second next node of a specific node may be determined based on a node subsequent to the specific node by two hierarchies. That is, a second next node of a specific node corresponding to a specific event may correspond to an event after two time-stamps from the specific event in the same sequence.

In an embodiment of the disclosure, the device may obtain and register information of second next nodes of corresponding nodes in the order of occurrence of the events. In an embodiment of the disclosure, when generating the first sequence graph, an indicator value regarding a second next node (e.g., a node 4 613) corresponding to a node 1 611 may be registered, and an indicator value regarding a second next node (e.g., a node 3 614) corresponding to a node 2 612 may be registered.

In an embodiment of the disclosure, when generating the second sequence graph, an indicator value regarding a second next node (e.g., a node 3 623) corresponding to a node 6 621 may be registered. The indicator value regarding the second next node (e.g., the node 3 614) registered when generating the first sequence graph may be registered in a node 2 622.

In an embodiment of the disclosure, when generating the third sequence graph, an indicator value regarding a second next node (e.g., a node 1 633) corresponding to a node 5 631 may be registered. The indicator value regarding the second next node (e.g., the node 3 614) registered when generating the first sequence graph may be registered in a node 2 632.

In an embodiment of the disclosure, when generating the fourth sequence graph, an indicator value regarding a second next node (e.g., a node 6 643) corresponding to a node 2 641 may be registered. The indicator value regarding the node 6 643 may be additionally registered in the node 2 641 in addition to the indicator value regarding the node 3 614 registered when generating the first sequence graph. When generating the fourth sequence graph, an indicator value regarding a second next node (e.g., a node 5 644) corresponding to a node 1 642 may be registered. The indicator value regarding the node 5 644 may be additionally registered in the node 1 642 in addition to the indicator value regarding the node 4 613 registered when generating the first sequence graph. The indicator value regarding the second next node (e.g., the node 3 623) registered when generating the second sequence graph may be registered in the node 6 643. The indicator value regarding the second next node (e.g., the node 1 633) registered when generating the third sequence graph may be registered in the node 5 644.

In the resulting sequence group graph, the indicator values regarding the node 4 and the node 5 may be registered in the node 1, the indicator values regarding the node 3 and the node 6 may be registered in the node 2, the node 3 and the node 4 may not have any indicator value regarding a second next node registered therein, the indicator value regarding the node 1 may be registered in the node 5, and the indicator value regarding the node 3 may be registered in the node 6.

In addition, an operation of obtaining and registering information about a second next node illustrated in FIG. 6 is not limited to the above-described method.

FIG. 7 is a diagram illustrating an operation of generating a sequence group graph 720 from a plurality of sequence graphs 710 and obtaining a computation graph 740 by using an indicator value regarding a second next node registered in each of nodes 723, according to an embodiment of the disclosure.

FIG. 7 illustrates the same sequence graph group as the plurality of sequence graphs 110 of FIG. 1 and the plurality of sequence graphs of FIG. 6. The device may generate the sequence group graph 720 based on the plurality of sequence graphs 710.

The sequence group graph 720 may include the nodes 723 corresponding to respective events, and edges 721 connecting the nodes 723 based on a time-series order of the events. In an embodiment of the disclosure, the sequence group graph 720 may include all of the nodes 713 and the edges 711 included in the plurality of sequence graphs 710. In an embodiment of the disclosure, the generated sequence group graph 720 may include, as a subgraph, each sequence graph 715 included in the plurality of sequence graphs 710 as it is. In an embodiment of the disclosure, an indicator value regarding a second next node obtained in a manner similar to that described above with reference to FIG. 6 may be registered in each of the nodes 723 of the sequence group graph 720.

In an embodiment of the disclosure, the device may sample the generated sequence group graph 720 based on a time-series order of events included in corresponding sequence graphs of the plurality of sequence graphs 710. Referring to FIG. 7, after the current event is determined, the sequence group graph 720 may be rearranged based on a reference node 731 corresponding to the current event.

For example, in the case where the reference node 731 is determined as a node 3, a rearrangement operation may include arranging the reference node 731 in a first layer 741, arranging a node 2 and a node 4 in a second layer 743 that are prior to the node 3 (i.e., the reference node 731) by one hierarchy, connecting the reference node 731 to each of the node 2 and the node 4 that are prior to the reference node 731 by one hierarchy by edges, and arranging the node 1, the node 5, the node 6 and the node 2 in a third layer 745 that are prior to the reference node 731 by two hierarchies, and connecting each of the nodes in the third layer 745 to corresponding nodes in the second layer 743 by edges.

Referring to FIG. 7, in a rearranged sequence group graph 730, the node 3 (i.e., the reference node 731) in the first layer 741 may be connected to the node 2 and the node 4 in the second layer 743, respectively, the node 2 in the second layer 743 may be connected to a node 1, a node 5, and a node 6 in the third layer 745, and the node 4 in the second layer 743 may be connected to a node 2 in the third layer 745.

In an embodiment of the disclosure, the device may sample the rearranged sequence group graph 730 by using an indicator value regarding a second next node registered in each of the nodes. The sampling operation may include an operation of removing nodes 745-2 that do not include, as an indicator value regarding a second next node, the reference node 731, from among the nodes that are prior to the reference node 731 by two hierarchies. Referring to FIG. 7, the nodes 745-2 that do not include, as an indicator value regarding a second next node, the reference node 731 in the first layer 741 that is subsequent thereto by two hierarchies may be removed from among nodes in the third layer 745. In an embodiment of the disclosure, from among the nodes (the node 1, the node 2, the node 5, and the node 6) in the third layer 745, the node 1 and node 5 745-2 that do not include information about the node 3 in the first layer 741 as an indicator value regarding a second next node may be removed.

In an embodiment of the disclosure, by using an indicator value regarding a second next node registered in each node included in the rearranged sequence group graph 730 in the sampling operation, sampling considering a time-series order of events that occurred in the device, that is, an event sequence, may be performed.

In an embodiment of the disclosure, the device may obtain the computation graph 740 for predicting a next event subsequent to the current event, by sampling the rearranged sequence group graph 730 by using an indicator value regarding a second next node registered in each node. Referring to FIG. 7, as a result, the computation graph 740 may include the node 3 in the first layer 741, the node 2 and the node 4 in the second layer 743, and the node 2 and the node 6 in the third layer 745. The obtained computation graph 740 may be input to the graph neural network GNN, and the graph neural network GNN may output a result of predicting a next event from the input computation graph 740. In an embodiment of the disclosure, in an operation of obtaining the computation graph 740 by sampling the sequence group graph 720, that is, in a neighbor sampling operation, sampling may be performed considering the order of nodes by using an indicator value regarding a second next node registered in each node. Accordingly, the accuracy of prediction of a next event may be increased.

Figure 8:
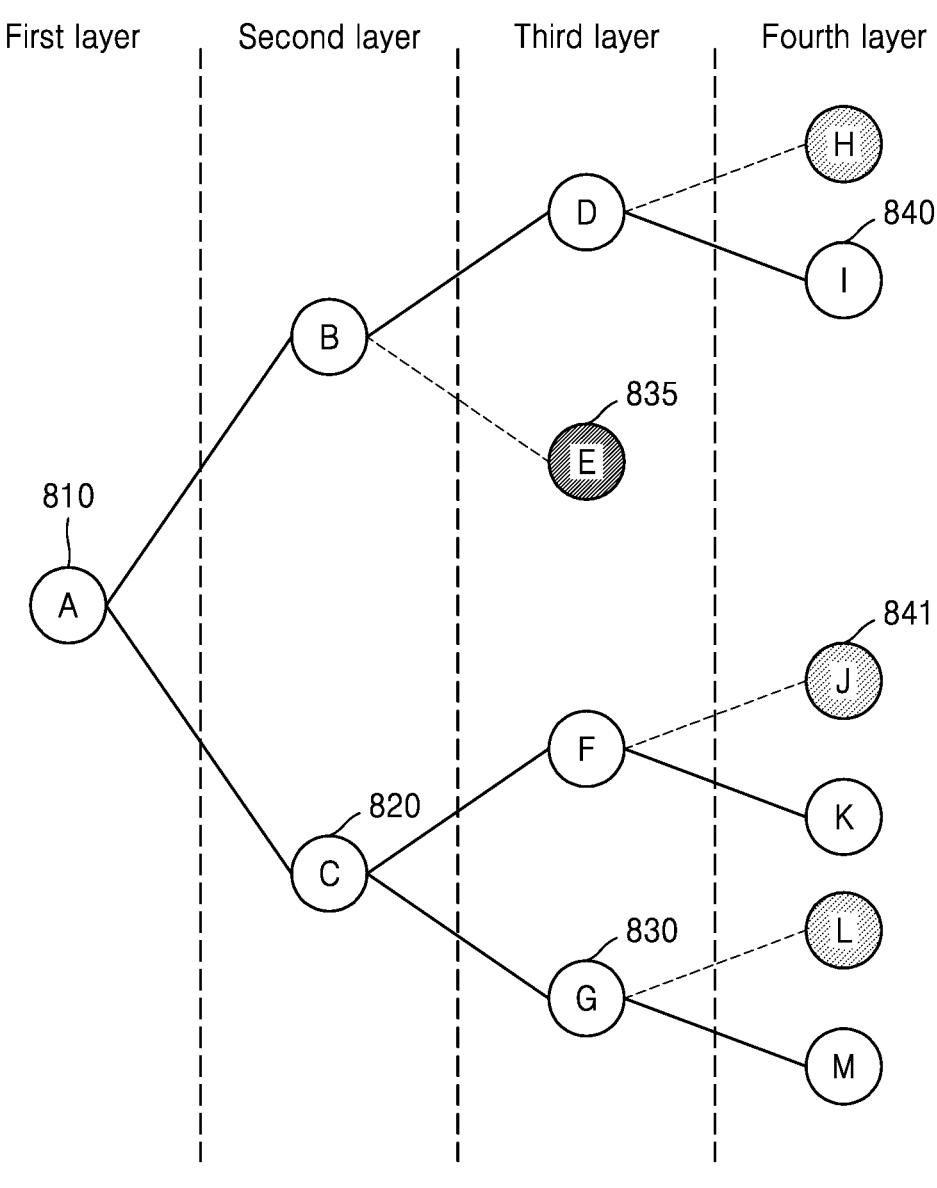
FIG. 8 is a diagram illustrating an operation of obtaining a computation graph having four hierarchies, according to an embodiment of the disclosure.

FIG. 8 is a diagram illustrating an operation of obtaining a computation graph having four hierarchies, according to an embodiment of the disclosure.

In an embodiment of the disclosure, in an operation of sampling a sequence group graph, an indicator value regarding a second next node registered in each node may be used.

Referring to FIG. 8, a first layer may include a node A 810 which is a reference node. A second layer may include a node B and a node C, which are first previous nodes of the node A included in the first layer. The first previous nodes of the node A included in the second layer may be connected to the node A by edges, respectively.

In an embodiment of the disclosure, a third layer may include nodes 830 that have, as a second next node, a node included in the first layer, among first previous nodes of the nodes included in the second layer. For example, a node D may be a first previous node of the node B and may have the node A as a second next node. In this case, the node D may be included in the third layer and may be connected to the node B included in the second layer by an edge. For example, a node E may be a first previous node of the node B, but may not have the node A as a second next node. In this case, the node E may be removed from the third layer, and an edge between the node E and the node B may also be removed. For example, a node F and a node G may be first previous nodes of the node C, and each may have the node A as a second next node. In this case, the node F and the node G may be included in the third layer, and may be connected to the node C, which is a first next node thereof, included in the second layer, by edges, respectively.

In an embodiment of the disclosure, a fourth layer may include nodes 840 that have, as a second next node, at least one of the nodes included in the second layer, among first previous nodes of the nodes included in the third layer. For example, a node H may be a first previous node of the node D, but may not have the node B as a second next node. In this case, the node H may be removed from the fourth layer, and an edge between the node H and the node D may also be removed. For example, a node I may be a first previous node of the node D, and may have the node B as a second next node. In this case, the node I may be included in the fourth layer, and may be connected to the node D, which is a first next node thereof, included in the third layer, by an edge. Similarly, for example, a node J may be a first previous node of the node F, but may not have the node C as a second next node. In this case, the node J may be removed from the fourth layer, and an edge between the node J and the node F may also be removed. For example, a node K may be a first previous node of the node F, and may have the node C as a second next node. In this case, the node K may be included in the fourth layer, and may be connected to the node F, which is a first next node thereof, included in the third layer, by an edge. For example, a node L may be a first previous node of the node G, but may not have the node C as a second next node. In this case, the node L may be removed from the fourth layer, and an edge between the node L and the node G may also be removed. For example, a node M may be a first previous node of the node G, and may have the node C as a second next node. In this case, the node M may be included in the fourth layer, and may be connected to the node G, which is a first next node thereof, included in the third layer, by an edge.

Referring to FIG. 8, as a result, the computation graph including the node A in the first layer, the node B and the node C in the second layer, the node D, the node F, and the node G in the third layer, and the node I, the node K, and the node M in the fourth layer may be obtained by sampling the sequence group graph.

In another embodiment of the disclosure, second next node information and third next node information stored in each node may be used for the operation of sampling a sequence group graph.

Referring again to FIG. 8, the first layer may include the node A 810 which is a target node. The second layer may include the node B and the node C, which are first previous nodes of the node A included in the first layer. The first previous nodes of the node A included in the second layer may be connected to the node A by edges, respectively.

In an embodiment of the disclosure, the third layer may include the nodes 830 that have, as a second next node, the node included in the first layer, among the first previous nodes of the nodes included in the second layer. For example, the node D may be a first previous node of the node B and may have the node A as a second next node. In this case, the node D may be included in the third layer and may be connected to the node B included in the second layer by an edge. For example, the node E may be a first previous node of the node B, but may not have the node A as a second next node. In this case, the node E may be removed from the third layer, and the edge between the node E and the node B may also be removed. For example, the node F and the node G may be first previous nodes of the node C, and each may have the node A as a second next node. In this case, the node F and the node G may be included in the third layer, and may be connected to the node C included in the second layer, by edges, respectively.

In an embodiment of the disclosure, the fourth layer may include the nodes 840 that have, as a third next node, the node included in the first layer, among the first previous nodes of the nodes included in the third layer. For example, the node H may be a first previous node of the node D, but may not have the node A as a third next node. In this case, the node H may be removed from the fourth layer, and the edge between the node H and the node D may also be removed. For example, the node I may be a first previous node of the node D, and may have the node A as a third next node. In this case, the node I may be included in the fourth layer, and may be connected to the node D, which is a first next node thereof, included in the third layer, by an edge. For example, the node J may be a first previous node of the node F, but may not have the node A as a third next node. In this case, the node J may be removed from the fourth layer, and the edge between the node J and the node F may also be removed. For example, the node K may be a first previous node of the node F, and may have the node A as a third next node. In this case, the node K may be included in the fourth layer, and may be connected to the node F, which is a first next node thereof, included in the third layer, by an edge. For example, the node L may be a first previous node of the node G, but may not have the node A as a third next node. In this case, the node L may be removed from the fourth layer, and the edge between the node L and the node G may also be removed. For example, the node M may be a first previous node of the node G, and may have the node A as a third next node. In this case, the node M may be included in the fourth layer, and may be connected to the node G, which is a first next node thereof, included in the third layer, by an edge.

Referring to FIG. 8, as a result, the computation graph including the node A in the first layer, the node B and the node C in the second layer, the node D, the node F, and the node G in the third layer, and the node I, the node K, and the node M in the fourth layer may be obtained by sampling the sequence group graph.

The sampling operation on a sequence group graph having four or more layers is not limited to the above-described methods, and may be performed by any combination of the above-described two methods or by any other method.

Figure 9:
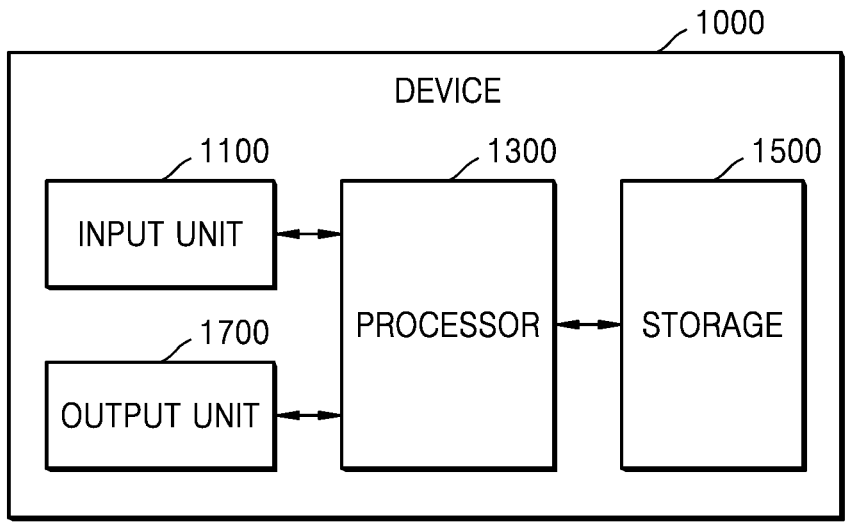
FIG. 9 is a block diagram of a device, according to an embodiment of the disclosure.

FIG. 9 is a block diagram of a device 1000, according to an embodiment of the disclosure.

Referring to FIG. 9, the device 1000 may include an input unit 1100, an output unit 1700, a processor 1300, and a storage 1500. However, all components illustrated in FIG. 9 are not essential components of the device 1000, and the embodiments of the disclosure are not limited thereto. The device 1000 may be implemented to include more or less components than the components illustrated in FIG. 9.

The input unit 1100 may obtain information related to an event occurring in the device or the like. The input unit 1100 may also obtain various pieces of information, such as user information from the user, current sequence information, current event information, time information, or the like. The input unit 1100 may also receive data for controlling the device 1000 from the user. For example, the input unit 1100 may be, but is not limited to, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, a jog switch, a communication module capable of communicating with another device, or the like.

The output unit 1700 may output a result of predicting an event to occur subsequent to the current event. In addition, the output unit 1700 may output recommendation information generated from a prediction result. In an embodiment of the disclosure, the output unit 1700 may output an audio signal, a video signal, or a vibration signal, and the output unit 1700 may include a display, an audio output unit, and a vibration motor.

The display may display information processed by the device 1000. For example, the display may display a user interface for receiving a user input. The audio output unit may output audio data. The audio output unit may include a speaker, a buzzer, or the like. The vibration motor may output a vibration signal. For example, the vibration motor may output a vibration signal corresponding to an output of audio data or video data. The vibration motor may also output a vibration signal when a touch is input to a touch screen.

The storage 1500 may store a program to be executed by the processor 1300 to control an operation of the device 1000. The storage 1500 may store a program including one or more instructions for controlling an operation of the device 1000. The storage 1500 may store instructions and program code that is readable by the processor 1300. In an embodiment of the disclosure, the processor 1300 may be implemented to execute instructions or code of the program stored in the storage 1500. The storage 1500 may store data input to the device 1000 or output from the device 1000.

The storage 1500 may include at least one of a flash memory, a hard disk, multimedia card micro-type or card-type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk.

One or more programs stored in the storage 1500 may be classified into a plurality of modules according to their functions. In an embodiment of the disclosure, the storage 1500 may include an artificial neural network such as a graph neural network (GNN). An artificial neural network such as a graph neural network (GNN) may be used to predict an event to occur subsequent to the current event, from a sequence group.

In an embodiment of the disclosure, a graph neural network (GNN) may be trained to predict an event to occur subsequent to the current event by using, as input values, user information corresponding to the current event, information of the current sequence, information of the current event, time information of the current event, and an obtained computation graph.

The processor 1300 may control the overall operation of the device 1000. The processor 1300 may perform operations according to an embodiment of the disclosure. The processor 1300 may control the input unit 1100, the output unit 1700, the storage 1500, and the like, by executing the programs stored in the storage 1500.

The processor 1300 may be configured as a hardware component to perform arithmetic, logic, input/output operations, and signal processing. For example, the processor 1300 may be, but is not limited to, at least one of a central processing unit (CPU), a microprocessor, a graphics processing unit (GPU), an application specific integrated circuit (ASIC), a digital signal processor (DSP), a digital signal processing device (DSPD), a programmable logic device (PLD), or a field programmable gate array (FPGA).

In an embodiment of the disclosure, the processor 1300 may identify events that occurred in the device by executing one or more instructions stored in the storage 1500. The sequence may represent a set of events having a temporal order. In an embodiment of the disclosure, all sequences included in a sequence group may correspond to the same user. In this case, a sequence group graph generated based on the corresponding sequence group may be personalized. An event predicted by using the personalized sequence group graph may have high prediction accuracy. In an embodiment of the disclosure, at least one event among events included in a sequence group may correspond to a user, and the current event may correspond to another user. In this case, user information may be used to select events to be used for generating a sequence group graph among a plurality of events included in the sequence group. For example, the processor 1300 may select, from among various users, a user whose age, gender, event history, and preference are identical or similar to those of the user corresponding to the current event, and may select events occurred by the selected user, for generating a sequence group graph.

In an embodiment of the disclosure, the processor 1300 may generate a sequence group graph by executing the one or more instructions stored in the storage 1500. The sequence group graph may include nodes corresponding to events and edges corresponding to a time-series order of the events. In an embodiment of the disclosure, the processor 1300 may register second next node information corresponding to each of the nodes included in the sequence group graph. The second next node information may be determined based on a node that is subsequent to a corresponding specific node by two hierarchies. In an embodiment of the disclosure, the sequence group graph may have four or more layers, and in this case, the processor 1300 may further store third next node information corresponding to each of the nodes included in the sequence group graph. The third next node information may be determined based on a node that is subsequent to a corresponding specific node by three hierarchies. In an embodiment of the disclosure, the processor 1300 may register, in each of edges included in the sequence group graph, values regarding the time-series order of the events.

In an embodiment of the disclosure, the processor 1300 may obtain the computation graph by sampling the generated sequence group graph, by executing the one or more instructions stored in the storage 1500. In an embodiment of the disclosure, the processor 1300 may sample the generated sequence group graph based on a time-series order of events included in a corresponding sequence group, and may obtain the computation graph for predicting a next event subsequent to the current event by performing the sampling.

In an embodiment of the disclosure, the processor 1300 may sample the generated sequence group graph based on the second next node information stored in each of the nodes included in the generated sequence group graph. Because the second next node information is determined based on a node that is subsequent to a specific node by two hierarchies, by using the second next node information, precedence relationships on the time domain with respect to nodes included in three hierarchies covering the specific node, first next nodes (nodes subsequent to the specific node by one hierarchy), and second next nodes (nodes subsequent to the specific node by two hierarchies) may be considered. Accordingly, in the sampling operation based on the second next node information, not only connection relationships between nodes but also a time-series order between the nodes may be considered.

In an embodiment of the disclosure, the processor 1300 may predict a next event subsequent to the current event from the obtained computation graph by using the graph neural network (GNN), by executing the one or more instructions stored in the storage 1500. In an embodiment of the disclosure, by sampling the sequence group graph to obtain the computation graph, the obtained computation graph may have a lower complexity and a reduced size of data compared to the sequence group graph. Due to the characteristics of the graph structure, the numbers of nodes and edges exponentially increase as the number of layers increases. Therefore, instead of inputting a sequence group graph to a neural network, the sequence group graph may be sampled to generate the sampled graph (or computation graph) and may be input to the neural network in order to reduce the computational load of prediction computation. Accordingly, in the case where the computation graph obtained by sampling the sequence group graph according to an embodiment of the disclosure is used for a subsequent operation, the complexity of computation may be reduced, and a computation result may be obtained more rapidly.

As described above, according to an embodiment of the disclosure, the sequence group graph including temporal order information of the events that occurred in the device, for example, n-th next node information, may be generated, and, by performing the neighbor sampling operation based on registered n-th next node information, the sequence group graph may be sampled considering the temporal order of the events, unlike sampling based on the importance or random sampling. By considering a sequence of nodes in the neighbor sampling operation, the accuracy of prediction of a next event may be further increased.

The above-described description of the embodiments of the disclosure is provided for illustrative purposes, and those of skill in the art will understand that the disclosure may be modified without modifying technical aspects and essential features of the disclosure. Therefore, it should be understood that the above-described embodiments are only examples in all respects and are not limited thereto. For example, the components described as single entities may be distributed in implementation, and similarly, the components described as distributed may be combined in implementation.

The scope of the disclosure is defined by the following claims, and all modifications or alternatives derived from the scope and spirit of the claims and equivalents thereof should fall within the scope of the disclosure.

What is claimed is:

1. A method of predicting an event to occur, performed by a device, the method comprising:

identifying a plurality of events that occurred in the device, wherein the plurality of events include first events corresponding to a first sequence and second events corresponding to a second sequence;

generating a first sequence graph based on a time-series order of the first events and generating a second sequence graph based on a time-series order of the second events;

generating a sequence group graph by updating the first sequence graph based on the second sequence graph, based on relationships between nodes and edges in the first sequence graph and the second sequence graph, wherein generating the sequence group graph comprises registering, as a value corresponding to each node in the sequence group graph, an indicator value regarding an n-th next node that is subsequent to a preceding node by n hierarchies, and n is an integer greater than or equal to 2;

obtaining a computation graph corresponding to a reference node indicating a current event, by sampling the generated sequence group graph based on time-series order information of the plurality of events, wherein obtaining the computation graph comprises:

determining the reference node indicating the current event;

rearranging the sequence group graph based on the reference node; and removing nodes that do not include the indicator value regarding the reference node as the indicator value regarding the n-th next node, from among nodes that are prior to the reference node by n hierarchies; and predicting the event to occur in the device using a graph neural network (GNN) based on the obtained computation graph.

2. The method of claim 1, wherein generating the first sequence graph comprises:

generating first nodes corresponding to each of the first events;

registering a value of each of the first events as a value corresponding to each of the first nodes;

connecting the first nodes by first edges based on an order of occurrence of the first events; and registering values indicating the time-series order of the first events as values corresponding to the first edges.

3. The method of claim 1, wherein the updating the first sequence graph based on the second sequence graph comprises:

registering, in response to a second node that matches an existing first node, a value registered in the second node, as a value corresponding to the matching first node, generating, in response to the second node that matches a non-existing first node, the second node as an additional first node, registering, in response to a second edge that matches an existing first edge, a value registered in the second edge, as a value corresponding to the matching first edge, and generating, in response to the second edge that matches a non-existing first edge, the second edge as an additional first edge.

4. The method of claim 1, wherein the sequence group graph comprises an indicator value regarding an m-th next node as a value corresponding to one of the nodes, wherein the obtaining the computation graph by sampling the sequence group graph based on the time-series order information of the plurality of events comprises:

rearranging the sequence group graph based on the reference node; and removing nodes that do not include, as the indicator value regarding the m-th next node, an indicator value regarding at least one of nodes that are prior to the reference node by (n-m) hierarchies, from among the nodes that are prior to the reference node by n hierarchies, and wherein m is an integer greater than or equal to 2 and less than n.

5. The method of claim 1, wherein the obtaining the computation graph comprises:

performing preliminary sampling on the generated sequence group graph based on the time-series order information of the plurality of events; and performing random sampling on the sequence group graph on which the preliminary sampling is performed.

6. The method of claim 1, wherein the obtaining the computation graph comprises obtaining a first computation graph and a second computation graph that is different from the first computation graph, and wherein the predicting the event to occur in the device comprises:

predicting a first next event to occur in the device from the first computation graph by using the GNN;

predicting a second next event to occur in the device from the second computation graph by using the GNN; and combining the predicted first next event with the predicted second next event, and generating a prediction result with respect to the event to occur in the device.

7. A device for predicting an event to occur, the device comprising:

a memory storing a program including one or more instructions; and at least one processor configured to execute the one or more instructions stored in the memory to:

identify a plurality of events that occurred in the device, wherein the plurality of events include first events corresponding to a first sequence and second events corresponding to a second sequence;

generate a first sequence graph based on a time-series order of the first events and generating a second sequence graph based on a time-series order of the second events;

generate a sequence group graph by updating the first sequence graph based on the second sequence graph, based on relationships between nodes and edges in the first sequence graph and the second sequence graph;

obtain a computation graph corresponding to a reference node indicating a current event, by sampling the generated sequence group graph based on time-series order information of the plurality of events; and predict the event to occur in the device using a graph neural network (GNN) based on the obtained computation graph, wherein the at least one processor configured to execute the one or more instructions stored in the memory to generate the sequence group graph by registering, as a value corresponding to each node in the sequence group graph, an indicator value regarding an n-th next node that is subsequent to a preceding node by n hierarchies, and n is an integer greater than or equal to 2 wherein the at least one processor configured to execute the one or more instructions stored in the memory to obtain the computation graph by:

determining the reference node indicating the current event;

rearranging the sequence group graph based on the reference node; and removing nodes that do not include the indicator value regarding the reference node as the indicator value regarding the n-th next node, from among nodes that are prior to the reference node by n hierarchies.

8. The device of claim 7, wherein the at least one processor is further configured to execute the one or more instructions to:

generate first nodes corresponding to each of the first events;

register a value of each of the first events as a value corresponding to each of the first nodes;

connect the first nodes by first edges based on an order of occurrence of the first events; and register values indicating the time-series order of the first events as values corresponding to the first edges.

9. The device of claim 7, wherein the at least one processor is further configured to execute the one or more instructions to:

perform preliminary sampling on the generated sequence group graph based on the time-series order information of the plurality of events; and perform random sampling on the sequence group graph on which the preliminary sampling is performed.

10. The device of claim 7, wherein the at least one processor is further configured to execute the one or more instructions to:

obtain a first computation graph and a second computation graph that is different from the first computation graph;

predict a first next event to occur in the device from the first computation graph by using the GNN;

predict a second next event to occur in the device from the second computation graph by using the GNN; and combine the predicted first next event with the predicted second next event, and generate a prediction result with respect to the event to occur in the device.

11. A non-transitory computer-readable medium having recorded thereon a program that, when executed by a processor, performs a method comprising:

identifying a plurality of events that occurred in a device, wherein the plurality of events include first events corresponding to a first sequence and second events corresponding to a second sequence;

generating a first sequence graph based on a time-series order of the first events and generating a second sequence graph based on a time-series order of the second events;

generating a sequence group graph by updating the first sequence graph based on the second sequence graph, based on relationships between nodes and edges in the first sequence graph and the second sequence graph, wherein generating the sequence group graph comprises registering, as a value corresponding to each node in the sequence group graph, an indicator value regarding an n-th next node that is subsequent to a preceding node by n hierarchies, and n is an integer greater than or equal to 2;

obtaining a computation graph corresponding to a reference node indicating a current event, by sampling the generated sequence group graph based on time-series order information of the plurality of events, wherein obtaining the computation graph comprises:

determining the reference node indicating the current event;

rearranging the sequence group graph based on the reference node; and removing nodes that do not include the indicator value regarding the reference node as the indicator value regarding the n-th next node, from among nodes that are prior to the reference node by n hierarchies; and predicting the event to occur in the device using a graph neural network (GNN) based on the obtained computation graph.

* * * * *